United States Patent
Zhang et al.

(10) Patent No.: US 11,843,123 B2
(45) Date of Patent: Dec. 12, 2023

(54) COBALT-SUBSTITUTED PEROVSKITE COMPOUNDS FOR SOLID OXIDE ELECTROCHEMICAL CELLS

(71) Applicant: Northwestern University, Evanston, IL (US)

(72) Inventors: Shan-Lin Zhang, Xi'an (CN); Scott A. Barnett, Evanston, IL (US); Matthew Lu, Evanston, IL (US)

(73) Assignee: Northwestern University, Evanston, IL (US)

( * ) Notice: Subject to any disclaimer, the term of this patent is extended or adjusted under 35 U.S.C. 154(b) by 566 days.

(21) Appl. No.: 16/976,013

(22) PCT Filed: Mar. 1, 2019

(86) PCT No.: PCT/US2019/020247
§ 371 (c)(1),
(2) Date: Aug. 26, 2020

(87) PCT Pub. No.: WO2019/169244
PCT Pub. Date: Sep. 6, 2019

(65) Prior Publication Data
US 2021/0043946 A1 Feb. 11, 2021

Related U.S. Application Data

(60) Provisional application No. 62/637,630, filed on Mar. 2, 2018.

(51) Int. Cl.
*H01M 4/90* (2006.01)
*C25B 11/069* (2021.01)
(Continued)

(52) U.S. Cl.
CPC .......... *H01M 4/9033* (2013.01); *C01G 51/66* (2013.01); *C25B 11/069* (2021.01);
(Continued)

(58) Field of Classification Search
CPC ....... H01M 4/9033; H01M 2008/1293; H01M 8/1246; C25B 11/0426; C25B 11/0773; C01G 51/66; C01G 51/006
See application file for complete search history.

(56) References Cited

U.S. PATENT DOCUMENTS

| | | |
|---|---|---|
| 5,306,411 A | 4/1994 | Mazanec et al. |
| 2005/0266297 A1* | 12/2005 | Irvine ............... B01D 53/228 |
| | | 423/594.2 |
| 2019/0140287 A1* | 5/2019 | Liu .................... H01M 4/9033 |

FOREIGN PATENT DOCUMENTS

KR 20130040311 A * 4/2013 .............. H01M 8/12

OTHER PUBLICATIONS

Cowin (Peter Cowin et al; Conductivity and redox stability of new perovskite oxides SrFe0.7TM0.2Ti0.1O3-δ (TM=Mn, Fe, Co, Ni, Cu); Solid State Ionics, vol. 301, Mar. 2017, pp. 99-105; Available online Feb. 1, 2017) (Year: 2017).*

(Continued)

*Primary Examiner* — Jeremiah R Smith
(74) *Attorney, Agent, or Firm* — Bell & Manning, LLC

(57) ABSTRACT

Oxygen electrodes are provided, comprising a perovskite compound having Formula (I), $Sr(Ti_{1-x}Fe_{x-y}Co_y)O_{3-\delta}$ wherein $0.90 \geq x \geq 0.40$ and $0.02 \geq y \geq 0.30$. Electrochemical devices comprising such oxygen electrodes are also provided, comprising a counter electrode in electrical communication with the oxygen electrode, and a solid oxide electrolyte between the oxygen electrode and the counter electrode. Methods of using such electrochemical devices are also provided, comprising exposing the oxygen electrode to a fluid comprising $O_2$ under conditions to induce the reaction $O_2 + 4e^- \rightarrow 2O^{2-}$, or to a fluid comprising $O^{2-}$ under conditions to induce the reaction $2O^{2-} \rightarrow O_2 + 4e^-$.

13 Claims, 19 Drawing Sheets

(51) Int. Cl.
C01G 51/00 (2006.01)
H01M 8/1246 (2016.01)
H01M 8/12 (2016.01)

(52) U.S. Cl.
CPC ....... H01M 8/1246 (2013.01); *C01P 2002/34* (2013.01); *C01P 2002/50* (2013.01); *C01P 2002/72* (2013.01); *C01P 2004/03* (2013.01); *C01P 2004/84* (2013.01); *C01P 2006/32* (2013.01); *C01P 2006/40* (2013.01); *H01M 2008/1293* (2013.01)

(56) References Cited

OTHER PUBLICATIONS

Cowin2 (Peter Cowin et al; Conductivity and redox stability of perovskite oxide SrFe1-xTixO3-δ (x≤0.3); Solid State Sciences, vol. 46, Aug. 2015, pp. 62-70; available online May 19, 2015) (Year: 2015).*
Wiik (K. Wiik et al.; Oxygen permeation in the system SrFeO3-x-SrCoO3-y; Solid State Ionics, 152 (2002), p. 675) (Year: 2002).*
Jung, WooChul, and Harry L. Tuller. "Investigation of surface Sr segregation in model thin film solid oxide fuel cell perovskite electrodes." *Energy & Environmental Science* 5.1 (2012): 5370-5378.
Zhang, Shan-Lin, et al. "Cobalt-substituted SrTi$_{0.3}$Fe$_{0.7}$O$_{3-\delta}$: a stable high-performance oxygen electrode material for intermediate-temperature solid oxide electrochemical cells." *Energy & Environmental Science* 11.7 (2018): 1870-1879.
Baumann, F. S., et al. "Quantitative comparison of mixed conducting SOFC cathode materials by means of thin film model electrodes." *Journal of the Electrochemical Society* 154.9 (2007): B931-B941.
Nguyen Q. Minh et al., "Reversible Solid Oxide Fuel Cell Technology for Green Fuel and Power Production," *The Electrochemical Society Interface*, Winter 2013: 55-62.
V. V. Kharton et al., Surface-limited ionic transport in perovskites Sr$_{0.97}$(Ti,Fe,Mg)O$_{3-\delta}$, Journal of Materials Chemistry, 2000, 10, 1161-1169.
W. Jung et al., "impedance study of SrTi$_{1-x}$Fe$_x$O$_{3-\delta}$(x=0.05 to 0.80) mixed ionic-electronic conduction model cathode," Solid State Ionics, 2009, 180, 843-847.
A. Rothschild et al., "Electronic Structure, Defect Chemistry, and Transport Properties of SrTi$_{1-x}$Fe$_x$O$_{3-\gamma}$ Solid Solutions," Chemistry of Materials, 2006, 18, 3651-3659.

M. Kuhn et al., "Oxygen Nonstoichiometry and Defect Chemistry of Perovskite-Structured Ba$_x$Sr$_{1-x}$Ti$_{1-y}$Fe$_y$O$_{3-y/2+\delta}$ Solid Solutions", Chemistry of Materials, 2013, 25, 2970-2975.
W. Jung et al., "Investigation of Cathode Behavior of Model Thin-Film SrTi$_{1-x}$Fe$_x$O$_{3-\delta}$(x=0.35 and 0.5) Mixed Ionic-Electronic Conducting Electrodes," Journal of the Electrochemical Society, 2008, 155, B1194-B1201.
W. Jung et al., "A New Model Describing Solid Oxide Fuel Cell Cathode Kinetics: Model Thin Film SrTi$_{1-x}$Fe$_x$O$_{3-\delta}$ Mixed Conducting Oxides—a Case Study," Advanced Energy Materials, 2011, 1, 1184-1191.
Y. Chen et al., "Impact of Sr segregation on the electronic structure and oxygen reduction activity of SrTi$_{1-x}$Fe$_x$O$_3$ surfaces," Energy & Environmental Science, 2012, 5, 7979.
A. Nenning et al., "The Electrochemical Properties of Sr(Ti,Fe)O$_{3-\delta}$ for Anodes in Solid Oxide Fuel Cells," Journal of the Electrochemical Society, 2017, 164, F364-F371.
S. Cho et al., "Fe-substituted SrTiO$_{3-\delta}$—Ce$_{0.9}$Gd$_{1.1}$O 2 composite anodes for solid oxide fuel cells," Energy & Environmental Science, 2013, DOI: 10.1039/c3ee23791e.
T. Zhu et al., "Hydrogen Oxidation Mechanisms on Perovskite Solid Oxide Fuel Cell Anodes," Journal of the Electrochemical Society, 2016, 163, F952-F961.
S. Molin et al., "Structural and electrical properties of Sr(Ti, Fe)O3-x$_{-\delta}$ materials for SOFC cathodes," Journal of Electroceramics, 2012, 28, 80-87.
V. V. Kharton et al., "Transport Properties and Thermal Expansion of Sr$_{0.97}$Ti$_{1-x}$Fe$_x$O$_{3-\delta}$(x_0.2+0.8)," Journal of Solid State Chemistry, 2001, 156, 437-444.
The International Search Report and Written Opinion issued in International Patent Application No. PCT/US19/20247 dated May 8, 2019, pp. 1-8.
PI Cowin et al., "Conductivity and redox stability of new perovskite oxides SrFe$_{0.7}$TM$_{0.2}$Ti$_{0.13-\delta}$ (TM=Mn, Fe, Co, Ni, Cu),", Solid State Ionics, 301, 2017, pp. 99-105. DOI: 10.1016/j.ssi.2017.01.017; abstract; section 2.1. Synthesis; figure 5.
L. Navarrete et al., "Boosting the oxygen reduction reaction mechanisms in IT-SOFC cathodes by catalytic functionalization," Journal of Materials Chemistry A, 2015, 3, pp. 16440-16444; DOI: 10.1039/c5a05187h; abstract.
R. Pinku et al., "Synthesis and characterization of Sr2TIMO 6 (M=Fe, Co) double perovskites for high temperature thermoelectric applications," Integrated Ferroelectrics, 174:1, pp. 34-42, Sep. 2016. DOI: 10,1080/10584587.2016.1190253.

* cited by examiner

COBALT-SUBSTITUTED PEROVSKITE COMPOUNDS FOR SOLID OXIDE ELECTROCHEMICAL CELLS

CROSS-REFERENCE TO RELATED APPLICATIONS

This application is a National Stage of International Application No. PCT/US19/20247, filed Mar. 1, 2019, which claims the benefit of U.S. Patent Application No. 62/637,630, filed Mar. 2, 2018, the contents of each of which are herein incorporated by reference.

REFERENCE TO GOVERNMENT RIGHTS

This invention was made with government support under 1545907 and DMR-1506925 awarded by the National Science Foundation and under DE-SC0016965 awarded by the Department of Energy. The government has certain rights in the invention.

BACKGROUND

Solid oxide cells (SOC) can be used both for converting fuels to electricity (solid oxide fuel cell mode) and storing electricity as a chemical fuel (solid oxide electrolysis cell mode). Solid oxide fuel cell systems provide an efficient and environment-friendly method for electrical generation using a wide variety of fuels including hydrogen and hydrocarbons. On the other hand, solid oxide electrolysis is being developed as a method for converting excess renewable electricity into fuels such as hydrogen, methane, gasoline, and methanol. Alternatively, reversibly-operated solid oxide cells can be used as an electricity storage method. More widespread commercialization of these technologies will require reduced system cost and improved long-term durability. A reduction in cell operating temperature from current values, ~800° C. to below 700° C., is expected to reduce cell degradation rates, e.g., by reducing Cr volatilization from interconnectors, while also decreasing the costs of system balance-of-plant components. Furthermore, system analyses indicate that the efficiency of $CO_2$-$H_2O$ co-electrolysis can be increased via a reduction in cell operating temperature.

The main processes limiting SOC power density are thermally activated, such that lowering the operating temperature increases cell area-specific resistance. It is thought that the oxygen electrode process, i.e., oxygen reduction reaction (ORR) in fuel cell mode and oxygen evolution reaction (OER) in electrolysis mode, provides the dominant resistance as the operating temperature is reduced. Thus, there has been a particular focus on developing high-activity oxygen electrode materials for reduced-temperature SOCs. In order to reduce oxygen electrode polarization resistance at reduced operating temperature, there has been a shift from the widely-used $La_{0.8}Sr_{0.2}MnO_{3-\delta}$-$Zr_{0.84}Y_{0.16}O_{2-\delta}$ (LSM-YSZ) composite electrode to mixed ionically and electronically-conducting (MIEC) electrode materials. In particular, $La_{0.6}Sr_{0.4}Co_{0.2}Fe_{0.8}O_{3-\delta}$ (LSCF) is now used successfully in SOFC stacks, although electrode performance degradation has been observed due to Sr surface segregation hindering the oxygen surface exchange process. New oxygen electrode materials aimed at low-temperature operation have been developed, although they have yet to be adopted for stack development. Much of this research has focused on perovskite materials with Co and/or Fe cations, e.g. $La_xSr_{1-x}FeO_{3-\delta}$, $La_xSr_{1-x}CoO_{3-\delta}$ and $Sm_xSr_{1-x}CoO_{3-\delta}$. A number of these materials contain Ba, including $(Ln,Ba)CoO_3$ (Ln=La, Pr, etc.,) where ordering on the A-site may enhance performance, and $Ba_{0.5}Sr_{0.5}Co_{0.8}Fe_{0.2}O_{3-\delta}$ (BSCF), which exhibits excellent performance even at temperatures <600° C. However, Ba surface segregation and absorption of $CO_2$ make these materials unstable, and there is typically rapid degradation during cell operation. For example, the power density (at 750° C. and 0.8 V) of the cell with a BSCF cathode decreased from >1 W cm$^{-2}$ to 0.45 W cm$^{-2}$ after 500 hours testing. (X. D. Zhou, et al., *Electrochimica Acta*, 2012, 71, 44-49.) $Ln_2NiO_{4+\delta}$ (Ln=La, Nd, Pr) MIEC oxides have shown promise as oxygen electrodes, exhibiting fast oxygen transport coefficients and good electrode performance. However, these materials can be unstable under electrolysis operation; for example, $La_2NiO_4$ was shown to decompose to high-order Ruddlesden-Popper $La_3Ni_2O_7$ and $La_4Ni_3O_{10}$ oxides at 750° C. during electrolysis. (X. Tong, et al., *Ceramics International*, 2017, 43, 10927-10933.) Most electrodes are fabricated by powder processing, but liquid infiltration techniques have also been employed to produce highly-active nano-scale electrodes suitable for reduced-temperature SOCs. However, the ability to reduce polarization resistance by decreasing particle size is limited by particle coarsening that rapidly degrades performance.

SUMMARY

Provided are cobalt-substituted $Sr(Ti_{1-x}Fe_x)O_{3-\delta}$ compounds and oxygen electrodes and electrochemical devices comprising the compounds. Related methods are also provided.

In one aspect, oxygen electrodes are provided. In embodiments, an oxygen electrode comprises a perovskite compound having Formula I, $Sr(Ti_{1-x}Fe_{x-y}Co_y)O_{3-\delta}$ wherein $0.90 \geq x \geq 0.40$ and $0.02 \geq y \geq 0.30$. Electrochemical devices comprising such oxygen electrodes are also provided, comprising a counter electrode in electrical communication with the oxygen electrode, and a solid oxide electrolyte between the oxygen electrode and the counter electrode. Methods of using such electrochemical devices are also provided, comprising exposing the oxygen electrode to a fluid comprising $O_2$ under conditions to induce the reaction $O_2 + 4e^- \rightarrow 2O^{2-}$, or to a fluid comprising $O_{2-}$ under conditions to induce the reaction $2O^{2-} \rightarrow O_2 + 4e^-$.

Other principal features and advantages of the present disclosure will become apparent to those skilled in the art upon review of the following drawings, the detailed description, and the appended claims.

BRIEF DESCRIPTION OF THE DRAWINGS

Illustrative embodiments of the present disclosure will hereafter be described with reference to the accompanying drawings.

FIG. 1A shows XRD patterns. FIG. 1B shows total conductivity. FIG. 1C shows oxygen nonstoichiometry. FIG. 1D shows the thermal expansion coefficient.

FIG. 2A shows cracked surface morphology. FIG. 2B shows a representative 2D section from the 3D data set. FIG. 2C shows a 3D reconstruction obtained from focused ion beam-scanning electron microscopy (FIB-SEM) tomography. FIG. 2D shows calculated 3D parameters.

DETAILED DESCRIPTION

Figure 1A:
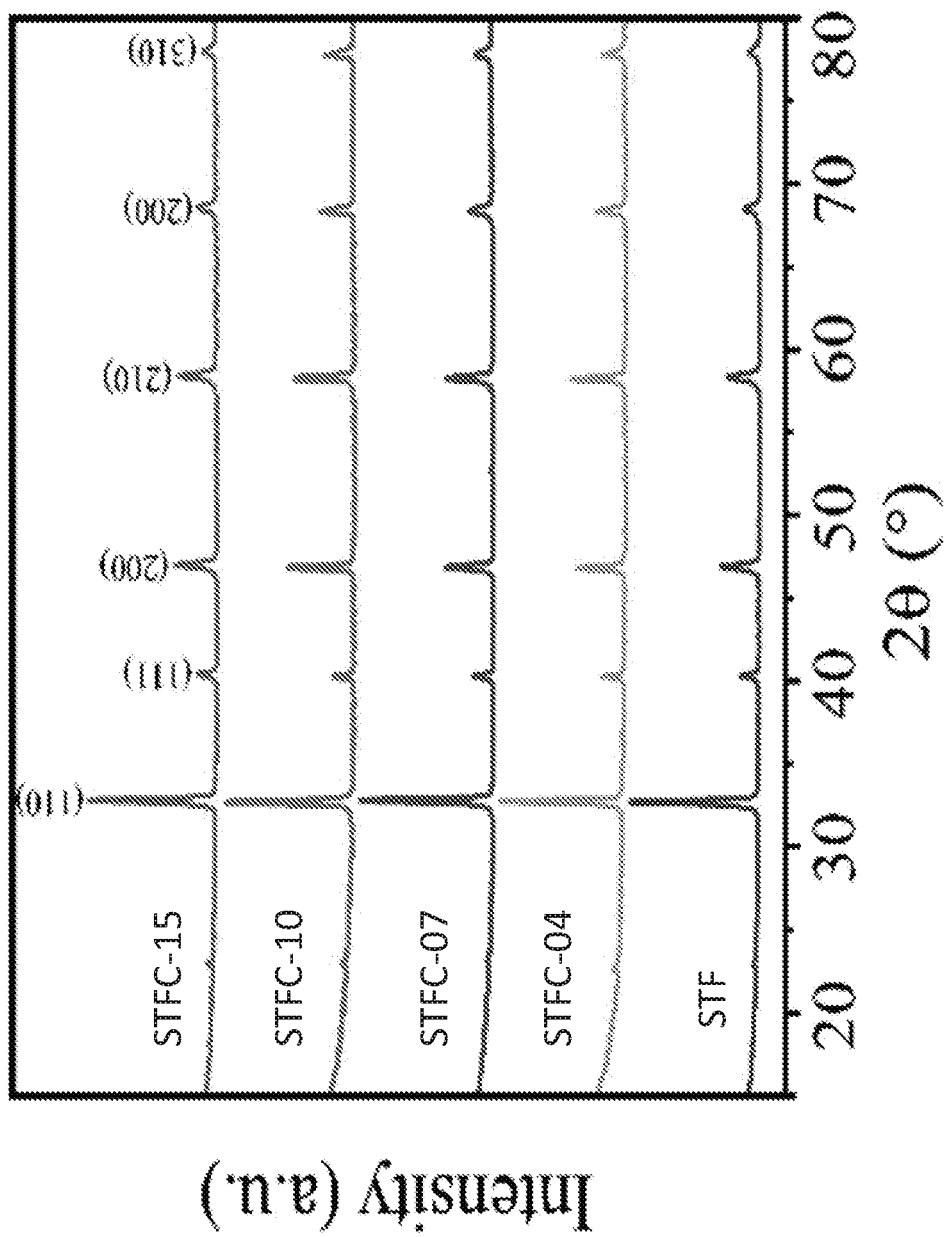
FIGS. 1A-1D show basic properties of STF ($Sr(Ti_{1-x}Fe_x)O_{3-\delta}$) and STFC ($Sr(Ti_{0.3}Fe_{0.7-x}Co_x)O_{3-\delta}$).

Provided are cobalt-substituted $Sr(Ti_{1-x}Fe_x)O_{3-\delta}$ compounds and oxygen electrodes and electrochemical devices comprising the compounds. Related methods are also provided. The present disclosure is based, in part, on the inventors' finding that a relatively small amount of cobalt significantly improves the performance of oxygen electrodes incorporating the present cobalt-substituted $Sr(Ti_{1-x}Fe_x)O_{3-\delta}$ compounds. By way of illustration, Example 1, below, demonstrates that as little as 7% Co increases the oxygen surface exchange coefficient ($k_{chem}$ (cm s$^{-1}$)) (inversely proportional to surface resistance) of the unsubstituted Sr(Ti, Fe)$O_{3-\delta}$ compound by about a factor of 3. Thus, the effect of Co addition is significantly greater than the effect on other perovskite compounds, e.g., a 20% addition of Co to (La, Sr)FeO$_3$ increased $k_{chem}$ by only a factor of 2. (See Baumann et al., J. Elect. Soc. 154 (9) B931 (2007).)

Cobalt-substituted $Sr(Ti_{1-x}Fe_x)O_{3-\delta}$ compounds are provided. In embodiments, a cobalt-substituted $Sr(Ti_{1-x}Fe_x)O_{3-\delta}$ compound has Formula I, $Sr(Ti_{1-x}Fe_{x-y}Co_y)O_{3-\delta}$ wherein $0.90 > x > 0.40$ and $0.02 > y > 0.30$. In embodiments, $0.80 > x > 0.50$ or $0.80 > x \geq 0.60$. In embodiments, $0.03 \geq y \geq 0.25$, $0.04 \geq y \geq 0.20$, or $0.04 \geq y \geq 0.15$. In embodiments, y=0.04, 0.05, 0.06, 0.07, 0.08, 0.09, 0.10 or 0.15.

In embodiments, a cobalt-substituted $Sr(Ti_{1-x}Fe_x)O_{3-\delta}$ compound has the Formula IA, $Sr(Ti_{0.3}Fe_{0.7-x}Co_x)O_{3-\delta}$ wherein $1 > x > 0$. In embodiments, $0.02 \geq x \geq 0.30$, $0.03 \geq x \geq 0.25$, $0.04 \geq x \geq 0.20$, or $0.04 \geq x \geq 0.15$. In embodiments, x=0.04, 0.05, 0.06, 0.07, 0.08, 0.09, 0.10 or 0.15.

The particular value of y in Formula I or x in Formula IA, i.e., the Co content, may be selected, in part, depending upon the desired operating temperature for an electrochemical device comprising the perovskite compound. As described further below, increasing the Co content suppresses the polarization resistance of oxygen electrodes comprising the perovskite compounds and facilitates lower operating temperatures. (See also, FIG. 4.) In the present perovskite compounds, 3-δ is used to indicate oxygen nonstoichiometry as is known.

The present perovskite compounds may be used to form oxygen electrodes for use in a variety of electrochemical devices. The oxygen electrode may be formed entirely of the selected perovskite compound. Alternatively, the selected perovskite compound may be coated onto a substrate to form the oxygen electrode. A variety of substrates may be used, depending upon the electrochemical device. The selected perovskite compound may be combined with other materials, e.g., a binder, to form the oxygen electrode.

The oxygen electrodes may be used in a variety of electrochemical devices, e.g., a variety of solid oxide cells (SOCs) including solid oxide fuel cells (SOFCs), solid oxide electrolysis cells (SOECs), and reversible solid oxide fuel cells (RSOFCs). Thus, in embodiments, the electrochemical device comprises an oxygen electrode comprising any of the present perovskite compounds, a counter electrode, and a solid oxide electrolyte between the oxygen electrode and the counter electrode. Any number of materials conventionally used in the counter electrodes and as the solid oxide electrolyte in SOCs may be used. The cells may further include barrier layers or interlayers (e.g., to address chemical incompatibility issues), interconnect layers (e.g., to facilitate stacking of individual cells), etc. The electrochemical devices may be provided as individual cells or stacked cells. Depending upon the application, the electrochemical devices may include fluid inlets for introducing air, fuel, water, or combinations thereof, as well as power supplies and/or external loads.

Figure 10:
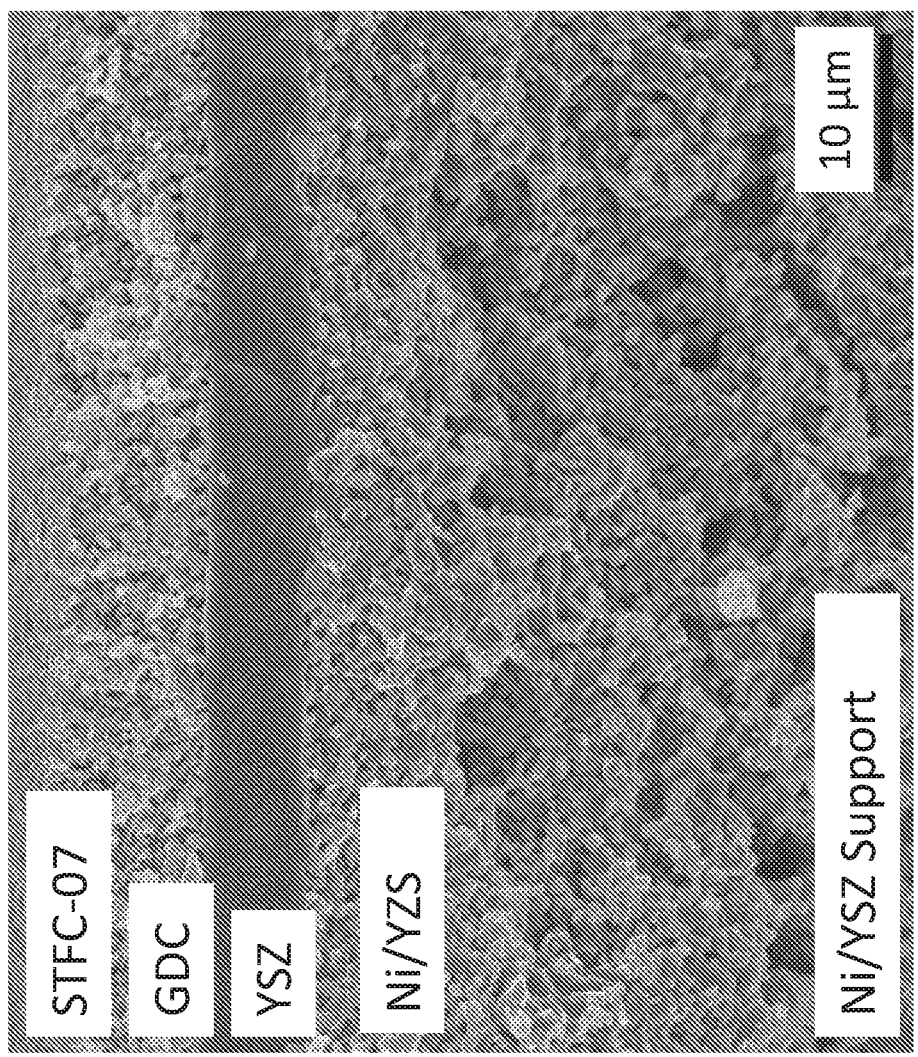
FIG. 10 shows a representative cross-sectional SEM image of the full fuel cell after the performance testing. The YSZ electrolyte has a thickness of about 8 μm and shows a very dense microstructure. The screen-printed STFC-07 electrode has a thickness of 10-15 μm and is bonded well with the GDC interlayer. The Ni/YSZ fuel electrode and support layer have thicknesses of 15 and 700 μm, respectively.
Figure 11:
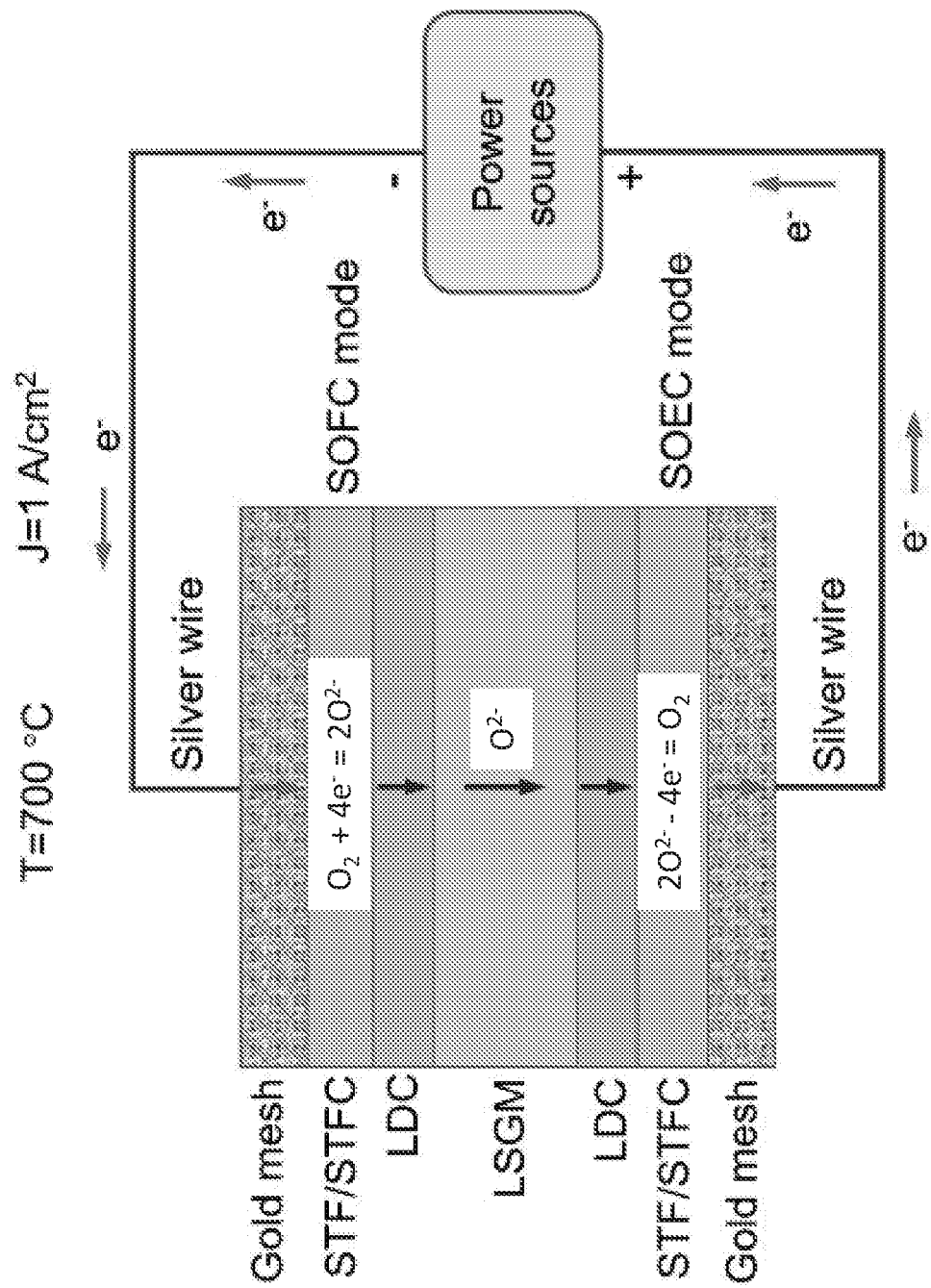
FIG. 11 shows the configuration of symmetrical cells and long-term stability test under a current supply.

Illustrative electrochemical devices and materials are described in the Example, below. By way of illustration, FIG. 10 shows an illustrative SOC comprising an oxygen electrode comprising STFC-07 ($Sr(Ti_{0.3}Fe_{0.63}Co_{0.07})O_{3-\delta}$) and a counter electrode comprising Ni/YZS. FIG. 11 shows an illustrative electrochemical device comprising an oxygen electrode and a counter electrode, both of which comprise $Sr(Ti_{0.3}Fe_{0.7-x}Co_x)O_{3-\delta}$.

The present perovskite compounds (as well as the oxygen electrodes and electrochemical devices based on the compounds) may be used in a variety of electrochemical reactions involving oxygen. In embodiments, the electrochemical reaction is the oxygen reduction reaction (ORR), and the method includes exposing an oxygen electrode comprising any of the present perovskite compounds to a fluid comprising $O_2$ (e.g., air) under conditions to induce the reaction $O_2+4e^-\rightarrow 2O^{2-}$. In embodiments, the electrochemical reaction is the oxygen evolution reaction (OER), and the method includes exposing an oxygen electrode comprising any of the present perovskite compounds to a fluid comprising $O^{2-}$ (e.g., from the reduction of $H_2O$ at the counter electrode or from the reduction of $O_2$ at the counter electrode) under conditions to induce the reaction $2O^{2-}\rightarrow O_2+4e^-$. As described in the Example, below, the present perovskite compounds include those which significantly reduce the polarization resistance of the oxygen electrode, thereby increasing the efficiency of $O_2$ reduction/$O^{2-}$ oxidation and enabling lower operating temperatures. In embodiments, the operating temperature for an electrochemical device comprising any of the present perovskite compounds is less than 750° C., less than 725° C., or less than 700° C. This includes embodiments in which the operating temperature is no more than 675° C., no more than 650° C., no more than 600° C., no more than 550° C., or no more than 500° C.

As also described in the Examples, below, the present perovskite compounds include those which exhibit high stability at these operating temperatures. Specifically, the present perovskite compounds include those for which the polarization resistance ($R_p$) of the oxygen electrode does not measurably increase at the operating temperatures above over extended periods of time, e.g., more than 350 hours, more than 500 hours, more than 750 hours, or more than 1000 hours. When characterizing the present oxygen electrodes by a $R_p$ value, such values may be measured using the techniques, electrochemical cells, and conditions described in the Example, below. For example, the $R_p$ values may refer to those obtained from a stability test conducted using the symmetric cell of FIG. 11 under the conditions described in the Examples below (i.e., electrodes exposed to ambient air either without current or with a constant direct current of 1 A cm$^{-2}$). By "not measurably increase" it is meant that the $R_p$ remains constant within the measurement error of the device being used to conduct the test (e.g., an IMG Electrochemical Workstation). By way of illustration, the $R_p$ after any of the extended periods of time, e.g., 1000 hours, above may be no more than 30%, no more than 25%, no more than 20%, no more than 15%, or no more than 10% greater than an initial $R_p$. These values may be obtained at any of the operating temperatures above, e.g., 650° C. or 550° C.

Methods of making the present perovskite compounds include those based on solid state reaction chemistry as described in the Examples, below. Methods of making electrochemical devices incorporating the present perovskite compounds are also described in the Examples, below.

In embodiments, the present perovskite compounds may be combined with praseodymium oxide ($PrO_x$) nanoparticles. An oxygen electrode comprising any of the present perovskite compounds may further comprise a plurality of praseodymium oxide ($PrO_x$) nanoparticles. These $PrO_x$ nanoparticles may be distributed on the surface of the perovskite compound and/or infiltrated into a region below the surface. The $PrO_x$ nanoparticles may have an average diameter in a range of from 10 nm to 100 nm. Example 2 presents experimental results showing that the addition of the $PrO_x$ nanoparticles further improves the polarization resistance of oxygen electrodes containing the present perovskite compounds, particularly at low operating temperatures. Example 2 also describes a single-step infiltration method for making the modified oxygen electrodes.

EXAMPLES

Example 1

Introduction

This example reports a comprehensive study of a new oxygen electrode composition, $Sr(Ti_{0.3}Fe_{0.7-x}Co_x)O_{3-\delta}$ (STFC) with x=0.04-0.15. It is found that a relatively small amount of Co improves electrode performance significantly. Fundamental properties including thermal expansion, electronic conductivity, oxygen non-stoichiometry, and oxygen transport coefficients are reported, the latter using a combination of impedance spectroscopy, three-dimensional tomography, and oxide thermodynamic factor measurements. Results from >1000 h life tests show the stable performance of the STFC electrodes. Single cells with $SrTi_{0.3}Fe_{0.63}Co_{0.07}O_{3-\delta}$ oxygen electrode, conventional yttria-stabilized zirconia (YSZ) thin-film electrolyte, and Ni-YSZ fuel electrode presented attractive performance and superior stability at intermediate temperatures. Overall, the results show a unique combination of high stability and low polarization resistance at temperatures below 700° C., establishing STFC as a highly desirable oxygen electrode material.

Experimental

Materials Synthesis and Cell Fabrication

Powders with compositions $SrTi_{0.3}Fe_{0.7}O_{3-\delta}$ (STF) and $SrTi_{0.3}Fe_{0.7-x}Co_xO_{3-\delta}$ with x=0.04 (STFC-04), x=0.07 (STFC-07), x=0.1 (STFC-10), and x=0.15 (STFC-15) were synthesized by solid state reaction. $SrCO_3$ (Sigma-Aldrich, 99.9%), $TiO_2$ (Alfa Aesar, 99.9%), $Fe_2O_3$ (Alfa Aesar, 99.8%), and $Co(NO_3)_2 \cdot 6H_2O$ (Alfa Aesar, 97.7%) were the starting materials. Stoichiometric amounts of the powders were ball-milled in ethanol for 24 hours with zirconia balls as the milling medium. The mixed powders were then dried and calcined at 1100° C. for 10 hours. The resulting STF and STFC powders were subsequently ball-milled in ethanol for another 48 hours as described above and dried.

The symmetrical cells had $La_{0.8}Sr_{0.2}Ga_{0.8}Mg_{0.2}O_{3-\delta}$ (LSGM) electrolytes with $La_{0.4}Ce_{0.6}O_{2-\delta}$ (LDC) barrier layers on both sides and identical STFC electrodes (FIG. 11). The sintered LSGM pellets (1450° C./5 h) had a diameter of 14.5 mm and a thickness of ~0.5 mm. The 3-5 μm thick LDC interlayers, used to avoid possible chemical compatibility issues between the LSGM electrolyte and the electrode materials, were applied at both sides of the LSGM electrolyte by screen printing and subsequent firing at 1350° C. for 4 h. STF and STFC inks were prepared by mixing STF or STFC powders and binder (V-737, Heraeus) with a weight ratio of 1:1.2 in a three-roll mill. The inks were then screen printed on both sides of the electrolyte pellet followed by firing at 1050° C. for 4 h. The electrode thickness was 10-15 μm, and the electrode area was 0.5 cm². In order to compare the performance and stability of STF and STFC with LSCF, identical symmetric cells were prepared but with LSCF electrodes. Commercial LSCF powder (Praxair) was used to make the ink, and the screen-printed electrodes were fired at 1100° C. for 2 h.

Ni/YSZ supported half cells were prepared by tape casting with 45 wt. % NiO+45 wt. % YSZ+10 wt. % starch (pore former) as the support layer, 50 wt. % NiO+50 wt. % YSZ as the fuel electrode, and YSZ as the electrolyte. In order to reduce the firing temperature, 3% mol $Fe_2O_3$ was added in the electrolyte as the sintering aid. Then, the cells were co-fired at 1250° C. for 2 h. Next, in order to prevent any reactions between YSZ electrolyte and STF/STFC electrodes, a $Gd_{0.1}Ce_{0.9}O_{2-\delta}$ (GDC) interlayer was screen printed on the YSZ electrolyte and then fired at 1200° C. for 2 h. The STFC oxygen electrodes were screen printed onto the GDC interlayer and calcined at 1050° C. for 4 h. A cross sectional SEM image of a typical full fuel cell, taken after testing, is shown in FIG. 10. Similarly, full fuel cells with LSCF electrodes were also prepared, and the electrode was fired at 1100° C. for 2 h. The total effective area of the oxygen electrode was 0.5 $cm^2$.

Materials Characterization

The phase structures of the STF and STFC powders were characterized via X-ray diffraction (XRD) analysis (Xpert PRO, PANalytical, Netherlands). Dense bar-shaped pellets with dimensions of ~5 mm×5 mm×25 mm, prepared by sintering at 1250° C. for 5 h, were used for conductivity and thermal expansion coefficient (TEC) measurements. The electrical conductivity was measured via a four-probe DC method with a Keithley 2400 source meter. The TEC was measured by a solid linear expansion coefficient apparatus (DIL 402C, NETZSCH). The oxygen nonstoichiometry for STF and STFC powders at different temperatures and different oxygen partial pressure ($pO_2$, $1\sim10^{-5}$ atm) were measured by a highly sensitive thermogravimetric setup. (A. Nenning, et al., 2017.) Cell microstructures were examined via scanning electron microscopy (SEM, Hitachi SU8030) and focused ion bean-SEM (FIB-SEM) three-dimensional (3D) tomography analysis. The Sr surface segregation of as-prepared and aged STF, STFC, and LSCF electrodes was examined using selective chemical etching combined with inductively coupled plasma optical emission spectrometry (ICP-OES) detection. (H. Wang, et al., *ECS Transactions*, 2017, 78, 905-913; and H. Wang, et al., *Journal of The Electrochemical Society*, 2016, 163, F581-F585.)

Electrochemical Measurements for Symmetric Cells and Fuel Cells

For symmetric cells, gold contact grids were screen printed on both sides to facilitate the current collection. The electrochemical impedance spectroscopy (EIS) measurements were conducted at 600-800° C. using an IM6 Electrochemical Workstation (ZAHNER, Germany) with a 20 mV AC signal in the frequency range of from 0.1 Hz to 100 kHz. EIS. The symmetric cells were life tested for >1000 h at 700° C. with both electrodes exposed to ambient air, either without current or with a constant direct current of 1 A $cm^{-2}$ (Keithley 2420 power supply). The configuration of the test is shown in FIG. 11. In this condition, the electrode on one side was working under SOFC mode and other side was working under SOEC mode. EIS measurements were made once per day during the life tests at 0 V over potential.

For the full fuel cell testing, a silver grid (Heraeus Inc., Pennsylvania) was screen printed onto the oxygen electrode to enhance current collection. The cells were sealed onto alumina tubes with Ag paste. For fuel cell testing, 100 sccm humidified $H_2$ (97% $H_2$+3% $H_2O$) was supplied to the Ni-YSZ anode while 150 sccm air was supplied to the STFC cathode, in the temperature range of 600-800° C. For electrolysis testing, the oxygen electrode was exposed to air (150 sccm) while 100 sccm $H_2$ flowed through a heated $H_2O$-containing bubbler that was supplied to the Ni-YSZ fuel electrode. In this study, the water in the bubbler was maintained at 81.7° C., entraining 50 vol. % water in the $H_2$ flow. Current-voltage curves were measured at 10 mV increments over the relevant voltage ranges for fuel cell and electrolysis operation. Life tests were carried out at 700° C. with current densities from 1 A $cm^{-2}$ to 1.5 A $cm^{-2}$, for 350 hours.

Results

Basic Properties: Phase Composition, Conductivity, Oxygen Nonstoichiometry, and Thermal Expansion Coefficient The XRD patterns from STF and STFC powders shown in FIG. 1A have only peaks representative of the cubic perovskite structure. The SFTC powders had no additional diffraction peaks assignable to free cobalt oxide, suggesting the successful substitution of cobalt into the perovskite lattice.

Figure 1B:
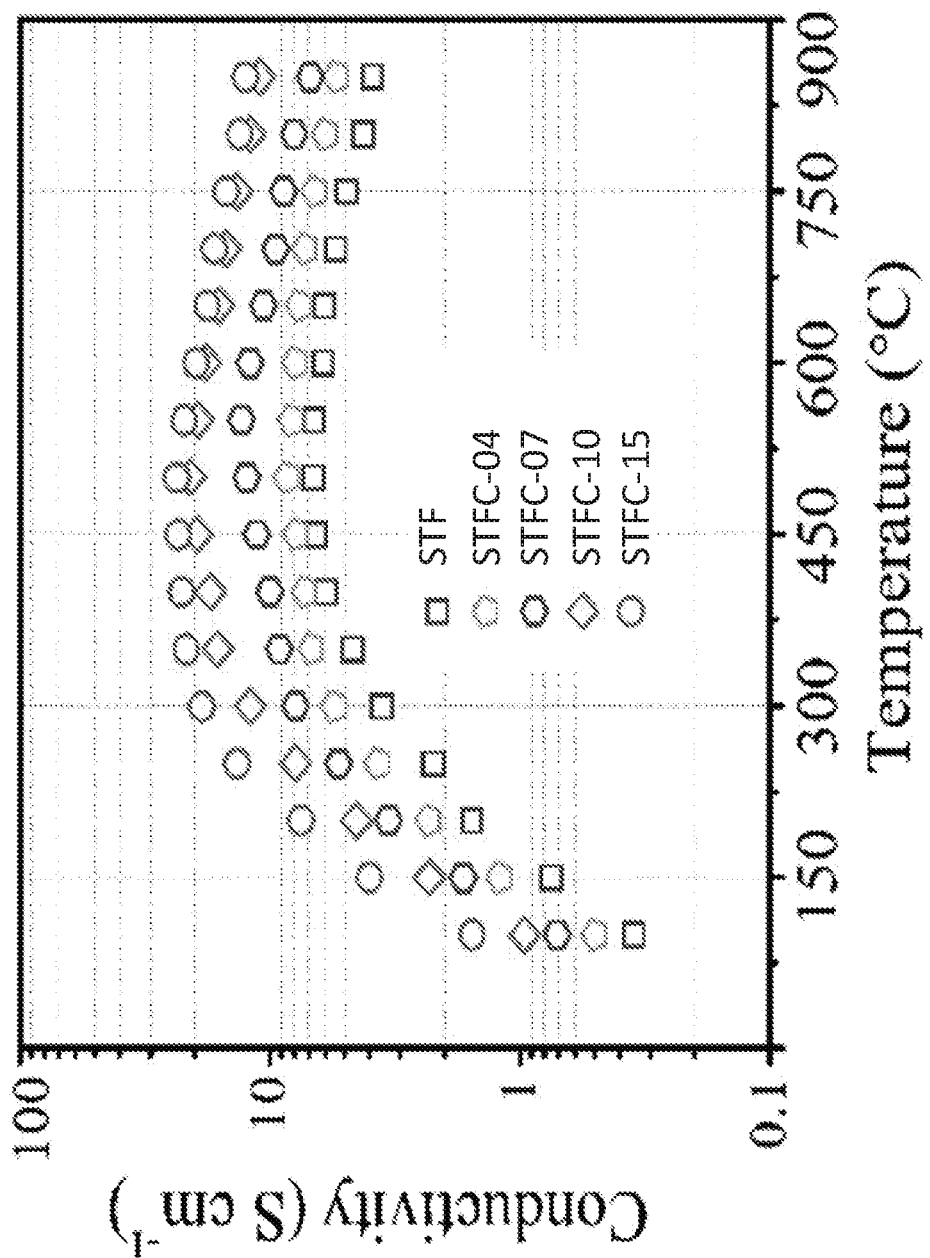

FIG. 1B shows the total electrical conductivities versus temperature for various compositions, which can be attributed to electronic conductivity since ionic conductivity is generally relatively low. The electrical conductivities gradually increased with increasing Co content, and all compositions showed a similar temperature dependence. Starting at low temperature, the conductivity increased first with increasing temperature, reached a maximum at ~400-500° C., and then decreased. That is, the STF-based materials exhibited semiconductive behavior at low temperatures but switched to metallic behavior at higher temperature. Increasing electronic conduction with increasing Co content is most probably associated with progressive delocalization of atomic levels and increasing bandwidth. Also, after some $Fe^{4+}/Fe^{3+}$ is substituted by larger $Co^{4+}$ and $Co^{3+}$ cations, it will demonstrate a larger lattice parameter and larger free volume. Furthermore, the covalence of the $Fe^{4+}/Fe^{3+}$—O bond is stronger than that of the $Co^{4+}/Co^{3+}$—O bond, indicating decreased electron localization and increased electrical conductivity with increasing Co content. The maximum electrical conductivity values were observed at ~500° C. and ranged from 6.7 S $cm^{-1}$ for STF to 24 S $cm^{-1}$ for STFC-15. These values should be sufficient for applications in thin (~20 μm) electrode functional layers, but it may be desirable to use higher-conductivity materials, e.g., LSM or LSCF, in the current collector layer.

Figure 1C:
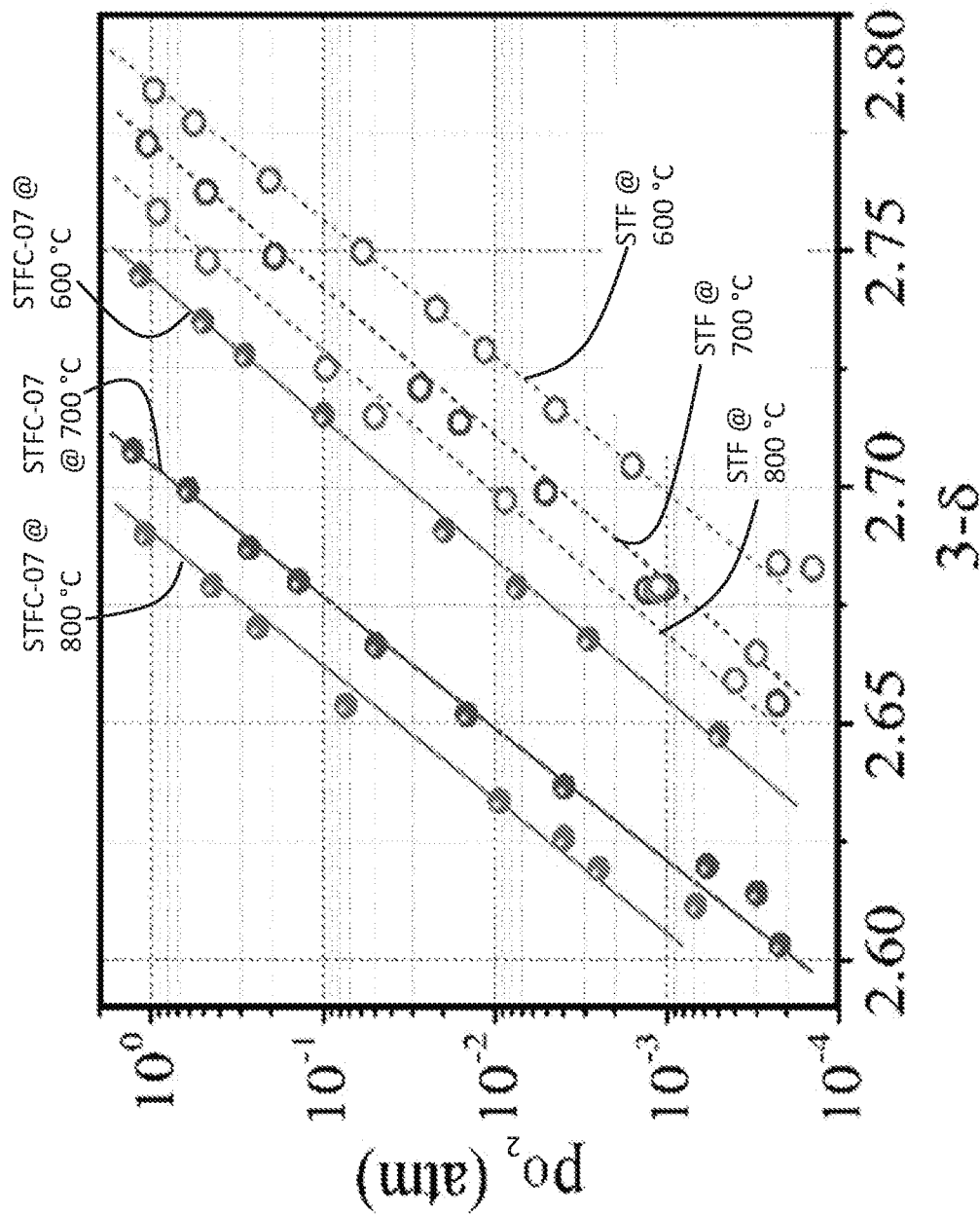

The oxygen nonstoichiometry 3-δ of STF and STFC-07, measured versus oxygen partial pressure $pO_2$ at various temperatures using thermogravimetry, is shown in FIG. 1C. 3-δ varied approximately linearly with log ($pO_2$) from 1 to $10^{-4}$ atm, was lower for STFC-07 than for STF, and decreased with increasing temperature. For example, at 700° C. in air ($pO_2$=0.21 atm), δ increased from 0.249 for STF to 0.316 for STF-07. The δ value for STF was similar to that reported for $SrFeO_{3-\delta}$, ~0.22 at 700° C. in air. (Z. Zhang, et al., *Advanced Energy Materials*, 2017, 7, 1700242-n/a.) Although the δ value for STFC-07 was lower than that of BSCF (~0.45), it was higher than the value for SSC (~0.15) at 700° C. in air. (J. Kim, et al., 2014 and S. Yoo, et al., *Journal of Power Sources*, 2013, 226, 1-7.) On the other hand, these δ values were ~10 times larger than for many common perovskite oxygen electrode materials: e.g., δ=0.03 for $La_{0.6}Sr_{0.4}Co_{0.2}Fe_{0.8}O_{3-\delta}$ (LSCF6428) at the same condition. (H. J. M. Bouwmeester, et al., *Journal of Solid State Electrochemistry*, 2004, 8, 599-605.)

Figure 1D:
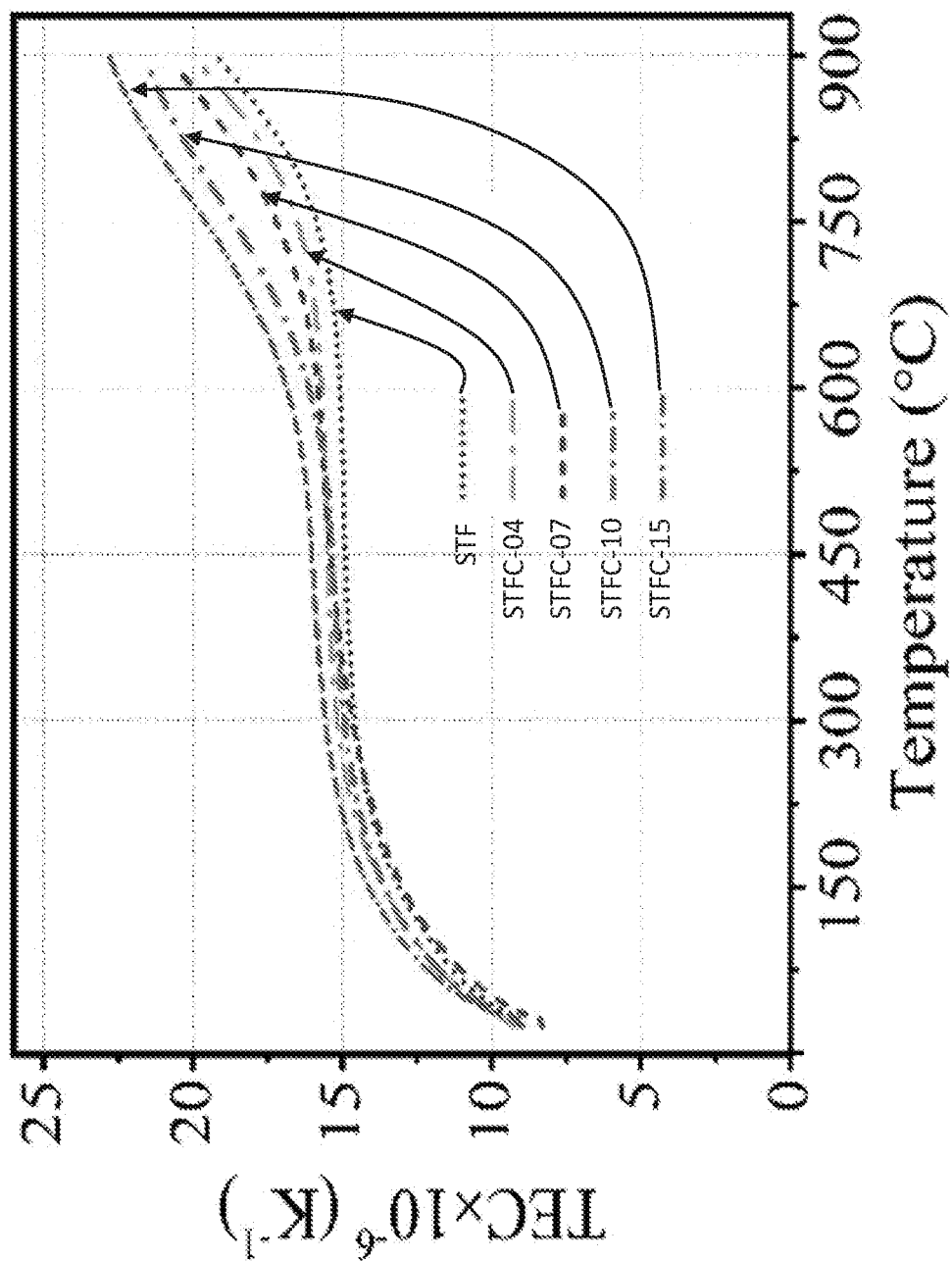

Thermal expansion coefficients (TECs) in the temperature range 25-900° C., calculated by fitting ΔL/L dilatometry data as a function of temperature, are shown in FIG. 1D. The TEC values were similar for all compositions below ~600° C., starting at $9\times10^{-6}$ $K^{-1}$ at ambient temperature, first increasing and then reaching a plateau at $\sim 1510^{-6}$ $K^{-1}$ from ~200-600° C. However, when the temperature was increased above 600° C., the TEC increased rapidly, with larger increases for the higher Co compositions. The increase in TECs with increasing temperature and Co content was probably associated with the increased oxygen loss shown in FIG. 1C. Another factor that may lead to increasing thermal expansion at temperatures above 600° C. is an increased disordering in the crystal lattice.

Microstructure Analysis for Porous STF and STFC Electrodes

Figure 2A:
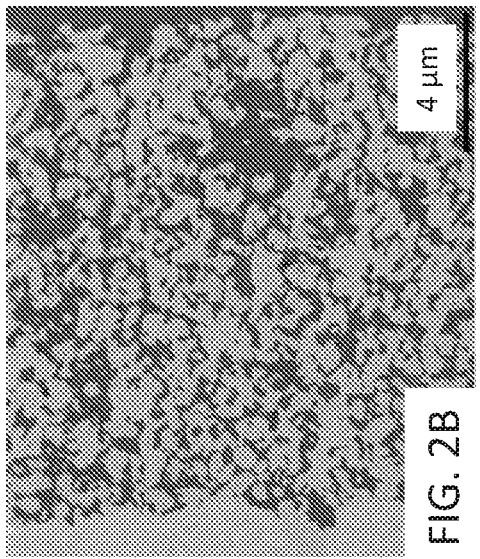
FIGS. 2A-2D show microstructure analysis of screen-printed STFC-07 (x=0.07) electrodes.
Figure 2B:
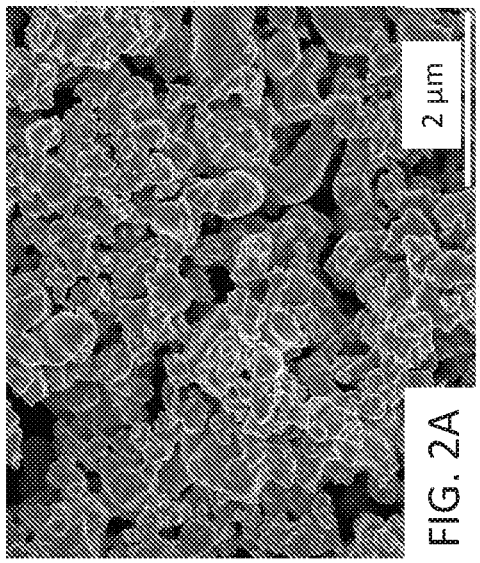
Figure 2C:
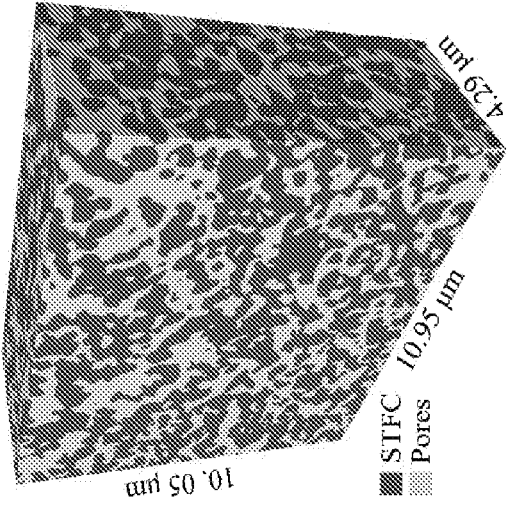
Figure 2D:
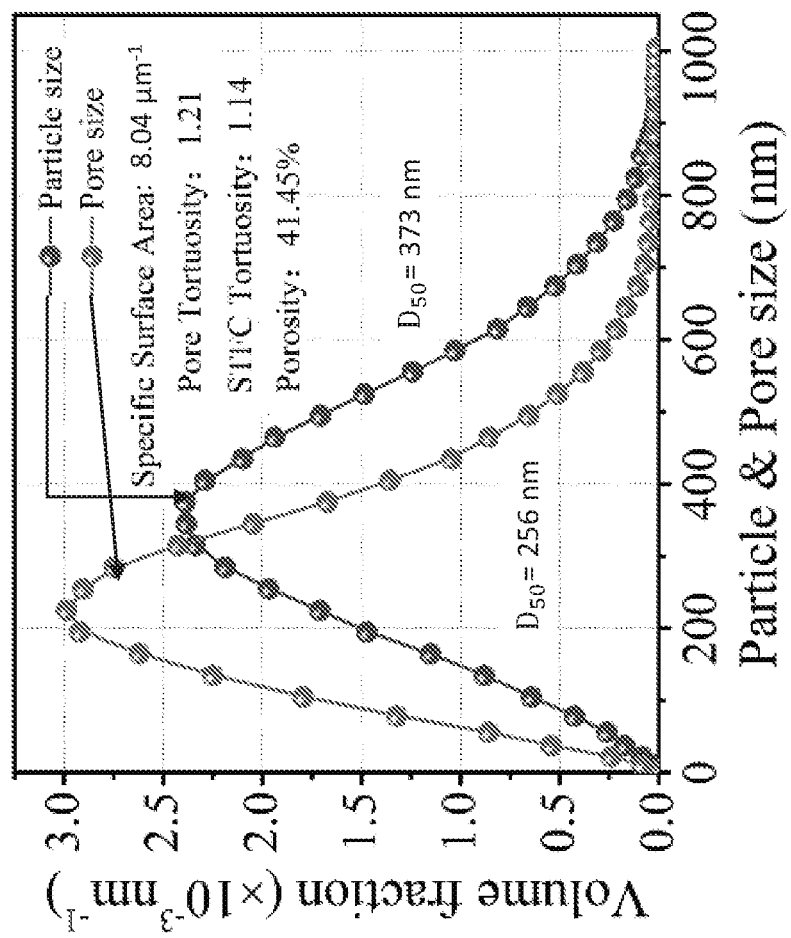

A fracture cross-sectional SEM image of the STFC-07 electrode is shown in FIG. 2A. The electrode structure appears similar to that of many powder-processed porous electrodes. (T. Zhu, et al., *Journal of The Electrochemical Society*, 2016, 163, F952-F961) All of the STF and STFC electrode compositions showed morphologies essentially identical to that shown in FIG. 2A (data not shown). Since the microstructure does not appear to vary with composition, the STFC-07 electrode was chosen as a representative case for detailed microstructural analysis. FIG. 2B illustrates a typical 2D section from the 3D electrode microstructure measured by FIB-SEM. FIG. 2C shows the 3D image representation of a portion of the electrode. The images show that the electrode particles were well connected with each other and the electrolyte. FIG. 2D shows the solid and pore size distributions and lists the microstructural data obtained from the 3D reconstruction. The electrode had a porosity of 41.45%. The mean STFC-07 solid particle size was ~375 nm, with a specific surface area a=8.04 $\mu m^{-1}$, and a solid phase tortuosity factor of 1.14.

Figures 3A, 3B:
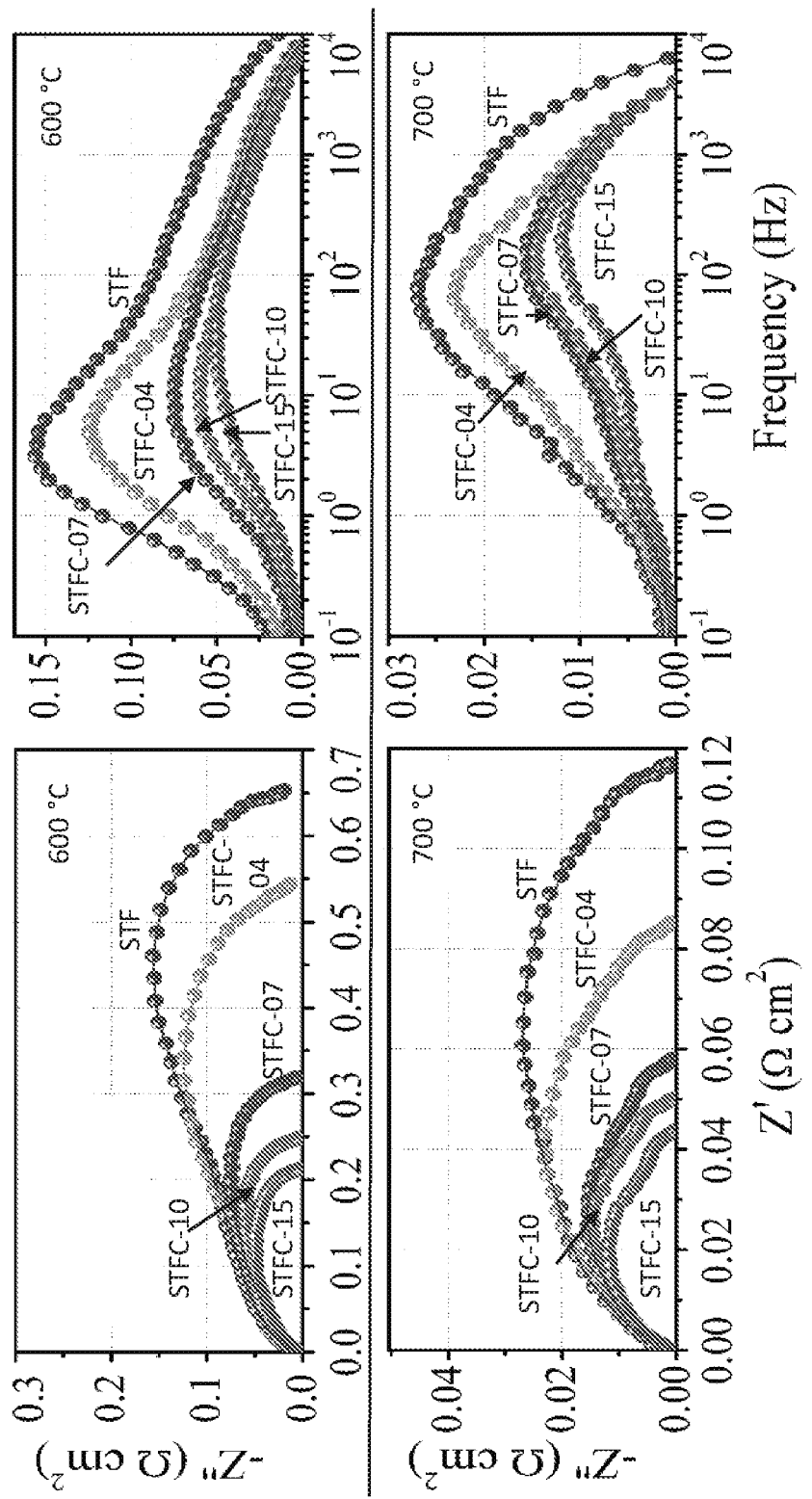
FIG. 3A shows typical Nyquist (left) and Bode (right) plots of electronic impedance spectroscopy (EIS) data, measured at 600° C.
FIG. 3B depicts typical Nyquist (left) and Bode (right) plots of EIS data, measured at 700° C. The high frequency intercepts in the data were set to zero in order to facilitate comparison of the polarization arcs.

Electrochemical Performance of Symmetrical Cells with STF and STFC Oxygen Electrodes FIGS. 3A-3B show Nyquist and Bode plots for the STF and STFC electrode symmetric cells, measured in air at 600° C. (FIG. 3A) and 700° C. (FIG. 3B). The high-frequency real-axis intercepts of the impedance arcs were all within a narrow range (~0.45-0.5 Ω $cm^2$ at 700° C.) and were as expected for these electrolyte thickness values. The data were thus plotted with the high frequency intercepts set to zero, in order to show clearly the changes in the polarization responses. Increasing the Co content caused a substantial decrease in the overall polarization resistance, with most of the decrease occurring between 0 and 7% Co. This was mainly due to a decrease in the dominant polarization response centered at ~2 to 200 Hz; the peak frequency generally shifted to lower frequency with increasing resistance. In the equivalent circuit used to fit the EIS data (not shown), this response was fit with a modified Gerischer element (G). Examples of the fits obtained are shown in FIGS. 3A-3B. Smaller responses at higher and lower frequencies were fit with R//QPE elements. The R2//QPE element at higher frequency, which is tentatively assigned to charge transfer between the electrode and electrolyte, was somewhat lower for STFC versus STF. The R3//QPE at low frequency (LF) did not vary significantly with cathode composition or temperature; this response can be associated with gas diffusion, which depends only on the electrode porosity and thickness, which did not appear to change with composition. The remainder of the equivalent circuit used to fit the EIS data (not shown) consisted of an inductor (L) primarily associated with measurement setup wires, the ohmic resistance (R1) associated with the electrolyte.

Figure 4:
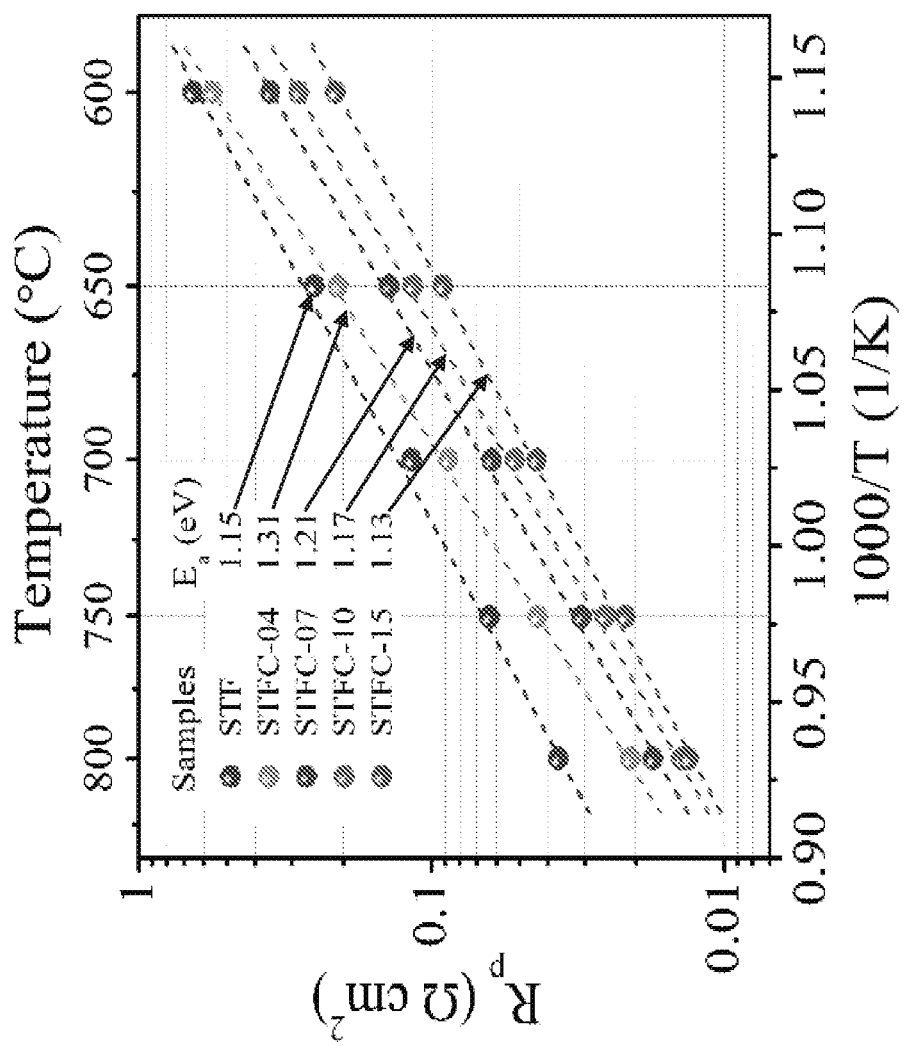
FIG. 4 shows Arrhenius plots of the electrode polarization resistance values measured from the real-axis intercepts on the Nyquist plots of FIGS. 3A-3B. These values were almost identical to those obtained from the equivalent circuit fits.

FIG. 4 gives a comparison of the total $R_p$ versus inverse temperature for all the electrodes, obtained from the real-axis intercepts of EIS data such as that shown in FIGS. 3A and 3B. At 600° C., $R_p$=0.65 Ω $cm^2$ for STF, which was too high to allow effective low-temperature SOFC operation, but Co doping yielded more useful resistance values, e.g., 0.32 $cm^2$ for STFC-07 and 0.21 Ω $cm^2$ for STFC-15. At 700° C., Co doping also provided an important decrease in $R_p$, from 0.117 Ω $cm^2$ for STF to 0.058 Ω $cm^2$ for STFC-07 and 0.043 Ω $cm^2$ for STFC-15. The STFC values are similar to values reported for similar conditions (700° C. in air) for BSCF (0.036 Ω $cm^2$) and $Sr_{0.5}Sm_{0.5}CoO_{3-\delta}$ (SSC, 0.063 Ω $cm^2$), but much lower than for LSCF (~0.16 Ω $cm^2$). (A. Giuliano, et al., *Electrochimica Acta*, 2017, 240, 258-266; H. Lv, et al., *Solid State Ionics*, 2006, 177, 901-906; H. Wang, et al., *Journal of The Electrochemical Society*, 2016, 163, F581-F585.) The activation energy, calculated from linear fits to the $\ln(R_p)$ vs. 1/T data in FIG. 4, increased from 1.15 eV for STF to 1.31 eV for STFC-04, but then decreased with the further increase of Co doping to 1.13 eV for the STFC-15 electrode. That is, the higher Co content STFC is more suitable for the application at lower temperatures.

Figures 5A, 5B:
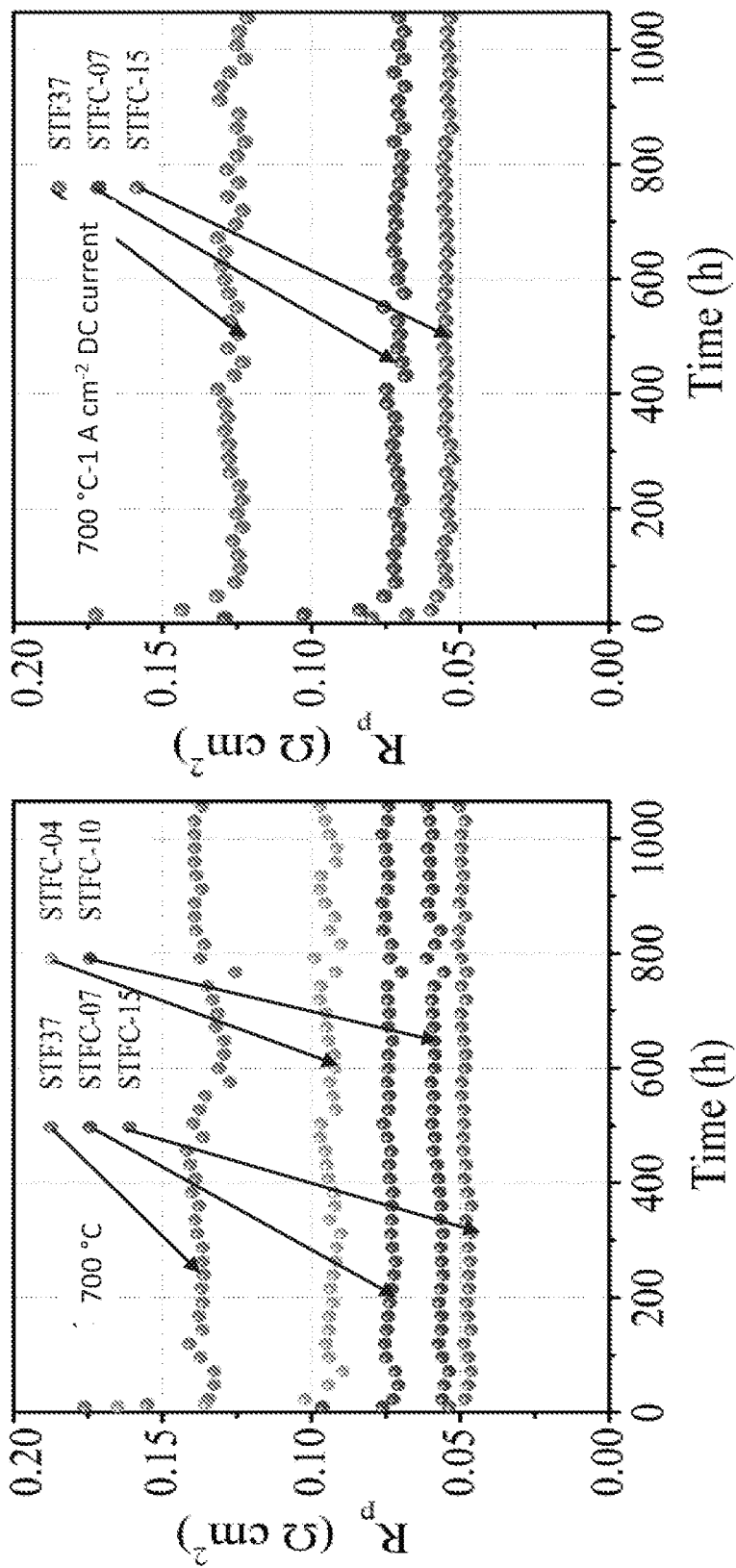
FIG. 5A shows the evolution of cell polarization resistance ($R_p$) at 700° C. for the symmetric cells with STF-based electrodes, without current.
FIG. 5B shows the evolution of cell polarization resistance ($R_p$) at 700° C. for the symmetric cells with STF-based electrodes running 1 A cm$^{-2}$ DC current.

Stability of Symmetrical Cells with STF and STFC Oxygen Electrodes and Sr Surface Segregation Stability is a key factor determining the practical utility of oxygen electrode materials. Thus, ~1000 h life tests were carried out at 700° C. on STF- and STFC-electrode symmetric cells, both with and without DC current. FIGS. 5A-5B show the evolution of $R_p$ with time for cells without (FIG. 5A) and with (FIG. 5B) current. There was typically an initial break-in period of ~50 h during which $R_p$ decreased, i.e., there was initial electrode activation as reported for other oxygen electrode materials such as LSM/YSZ. (G. Hughes, et al., 2012, 159, F858-F863.) After the initial break-in, $R_p$ remained stable, within measurement accuracy, for all the electrodes in the present study. Note that the cell ohmic resistance increased by ~5% during the life tests. The increase was faster initially, with the resistance tending to stabilize later in the test, and was similar with and without current (data not shown). A similar resistance increase was observed for cells with other electrodes. Thus, the ohmic resistance increase can be attributed to the slight conductivity degradation of the thick electrolyte and was not associated with the electrode.

Fracture cross sectional SEM images were taken from the STF and STFC-07 electrodes after ageing without current (data not shown) and with current on the SOFC side (data not shown) and on the SOEC side (data not shown). The electrode surfaces appeared identical to the unaged electrodes (data not shown). There were no signs of delamination or interfacial reactions in any case. The higher-magnification images showed no signs of particle coarsening within the electrode after the ageing.

For comparison purposes, similar cells with LSCF electrodes were aged at the same condition for more than 800 h (data not shown). These LSCF electrodes are essentially identical to those that have been characterized previously, with microstructure similar to the present STFC electrodes (data not shown). (H. Wang, et al., 2016) The ohmic resistance degraded ~5% after 800 h ageing, which is consistent with the result from the symmetric cells with STFC electrodes as mentioned above (data not shown). The initial $R_p$ for LSCF was 0.15-0.16 $\Omega$ cm$^2$, which is higher than that of STF (0.118 S$^.$2 cm$^2$) and STFC (0.056 $\Omega$ cm$^2$) at 700° C. In addition, $R_p$ increased with time, reaching >0.2 $\Omega$ cm$^2$ after 800 h ageing.

Figure 6:
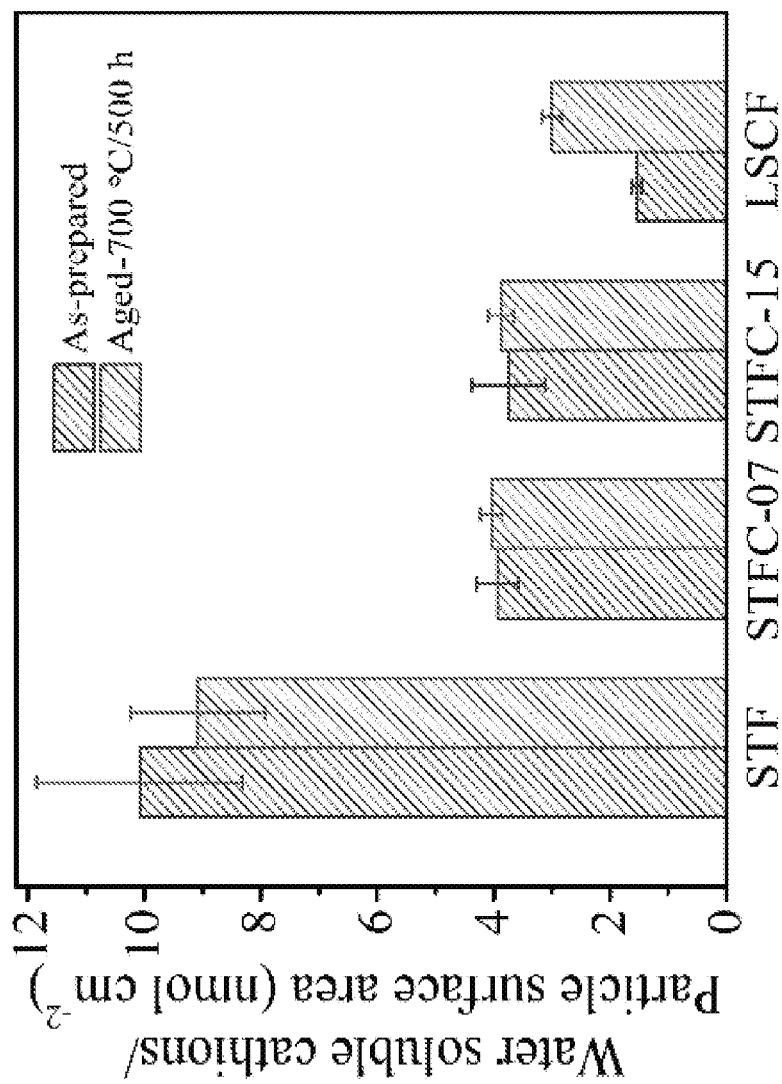
FIG. 6 shows the amount of Sr on as-prepared (all left bars) and aged electrode surfaces (all right bars), as measured by dissolution in ultrapure water. The detected amount was normalized by the electrode surface area, and the error bars were calculated from standard deviation of 3 measurements.

Selected STF, STFC, and LSCF electrodes were tested in the as-prepared state and after ageing in air at 700° C. for 500 h. Sr surface segregation was assessed using selective dissolution in ultrapure water and ICP analysis, with the results shown in FIG. 6. (H. Wang, et al., 2016) The amount of Sr segregated on STF was much larger than that for LSCF. This may be attributed, at least in part, to the lower Sr content in LSCF (40% on the A site) compared to STF (100% on the A site). The observation of Sr segregation on STF agrees with prior results on thin-film STF samples measured by XPS, where the surface Sr/(Ti +Fe) ratio was ~1.7 for 70% $SrTi_{0.3}FeO_{0.7}O_{3-\delta}$. (W. Jung, et al., Energy & Environmental Science, 2012, 5, 5370-5378.) However, STFC with 7 and 15% Co showed much lower surface Sr than STF, closer to the values observed for LSCF. This may play a role in the reduced $R_p$ observed for STFC compared to STF. At this point, it remains unclear why the Co addition decreased Sr segregation. For the STF and STFC electrodes, the Sr segregation did not change after ageing, within experimental error. This is another key difference with LSCF, where the surface Sr content increased over time, as shown in FIG. 6. This effect has been used to explain the performance degradation observed in LSCF. Thus, the good stability of the STF and STFC electrodes may be explained, at least in part, by the stable amount of segregated Sr. On the other hand, it is not clear why the initial performance was very good despite the relatively large amount of segregated Sr present.

Performance and Stability of Full Fuel Cells with STFC-07 Oxygen Electrode

Figure 7A:
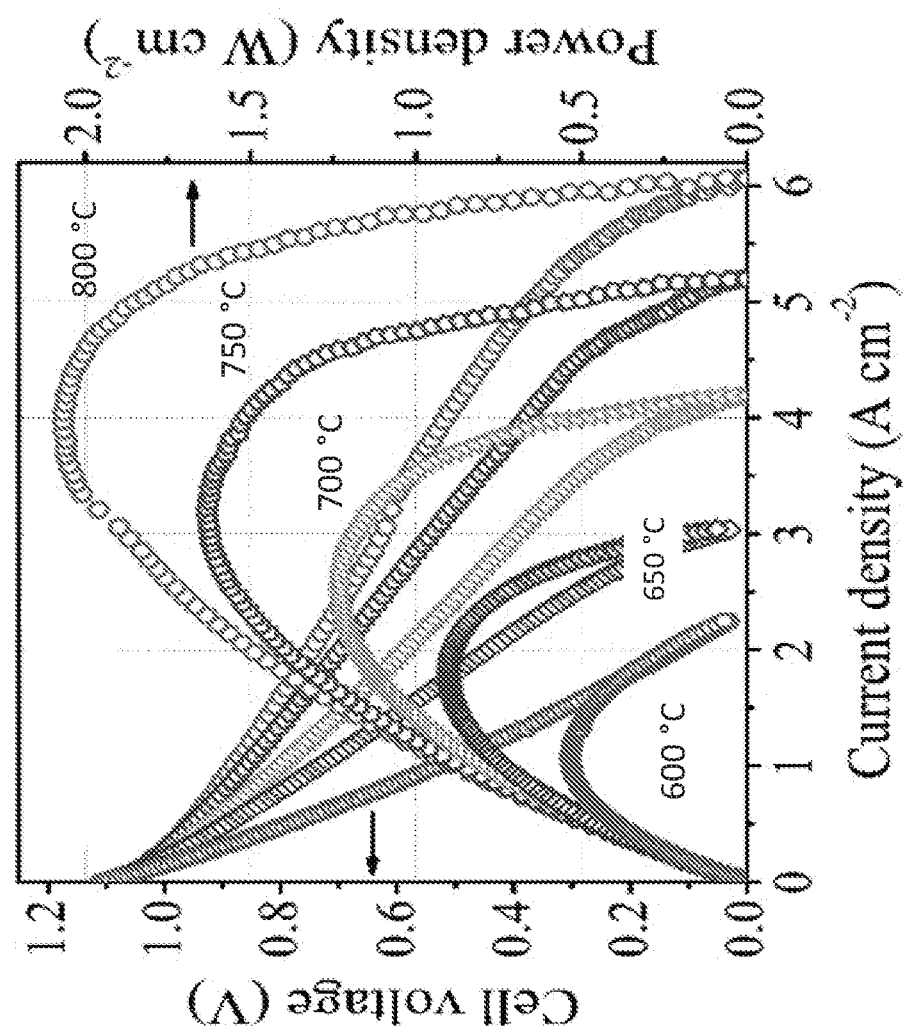
FIG. 7A shows I-V and corresponding I-P curves for the full fuel cell with STFC-07 electrode measured at different temperatures in air and 3% $H_2O$ humidified hydrogen.
Figure 7B:
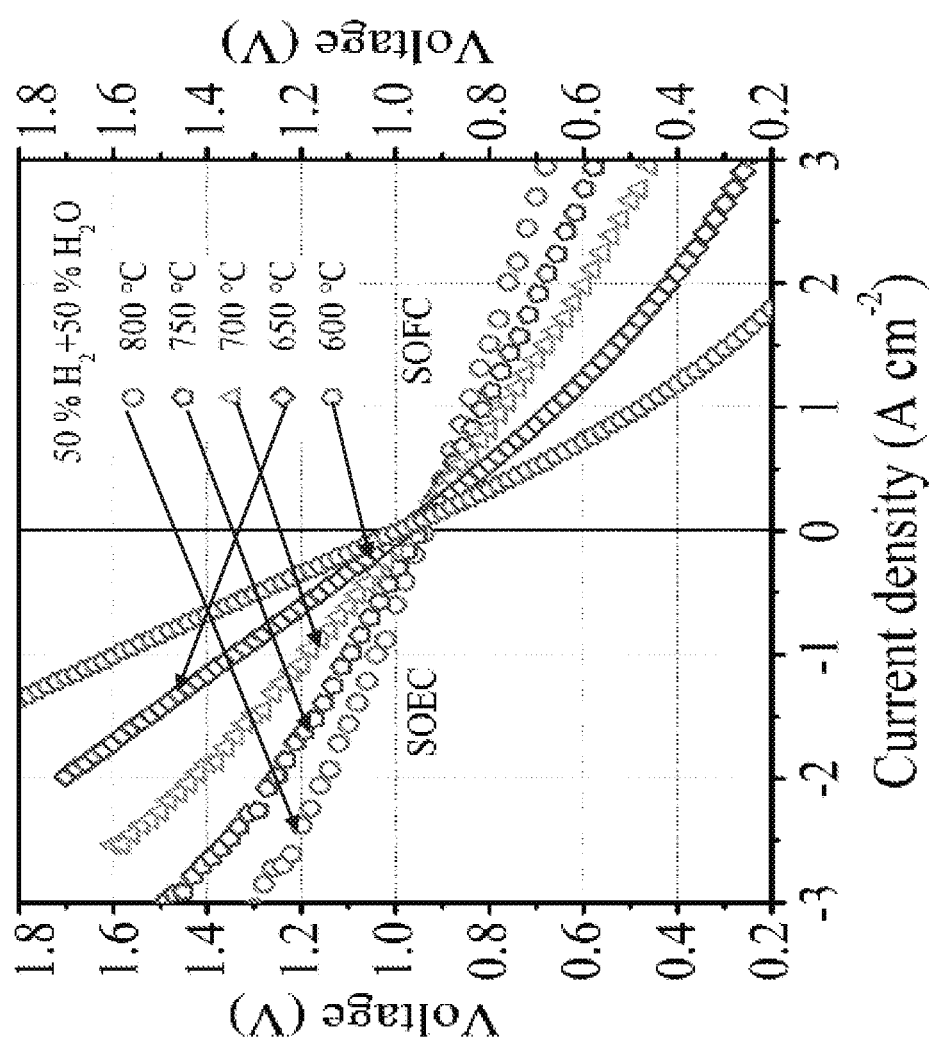
FIG. 7B shows voltage versus current density, measured at different temperatures in air and 50 vol. % $H_2$+50 vol. % $H_2O$.

The SFTC-07 oxygen electrodes were tested in full fuel cells (FIG. 10) to evaluate their performance under practical full fuel cell operation conditions. FIG. 7A shows typical SOC electrochemical characteristics under representative fuel cell conditions, i.e., in air and 3% $H_2O$+97% $H_2$ fuel. Peak power densities ranged from >2 W cm$^{-2}$ at 800° C. to >0.5 W cm$^{-2}$ at 600° C., similar to other high-performance YSZ-electrolyte SOCs. (Z. Gao, et al., Journal of Materials Chemistry A, 2015, 3, 9955-9964; G. Yang, et al., ACS Applied Materials & Interfaces, 2016, 8, 35308-35314.) FIG. 7B shows the voltage versus current density at different temperatures in electrolysis and fuel cell modes; the conditions were the same as in FIG. 7A, except that the fuel composition was 50% $H_2O$+50% $H_2$. At a typical electrolysis voltage of 1.3 V, the current densities were 3.03, 1.48, and 0.51 A cm$^{-2}$ at 800, 700, and 600° C., respectively; these values are comparable to the best reported solid oxide electrolysis results. (R. Knibbe, et al., Journal of The Electrochemical Society, 2010, 157, B1209-B1217; M.-B. Choi, et al., Journal of Power Sources, 2013, 239, 361-373.) The EIS data for the full fuel cells (data not shown) provides insights into the factors controlling the cell performance. For the cell measured in 50% $H_2$+50% $H_2$, the ohmic resistance was the main contribution at higher temperatures, with the STFC oxygen electrode becoming more important at lower temperatures. This may explain why the j-V curves show an approximately linear dependence at higher temperatures but show an activated behavior at lower temperatures. For the cell measured in 3% $H_2O$+97% $H_2$, fuel electrode responses that were apparently related to gas diffusion and an electrochemical process had resistances comparable to those from the oxygen electrode. This may help explain why an apparent limiting current is seen in FIG. 7A (3% $H_2O$+97% $H_2$) but not in FIG. 7B (50% $H_2O$+50% $H_2$).

Figure 8:
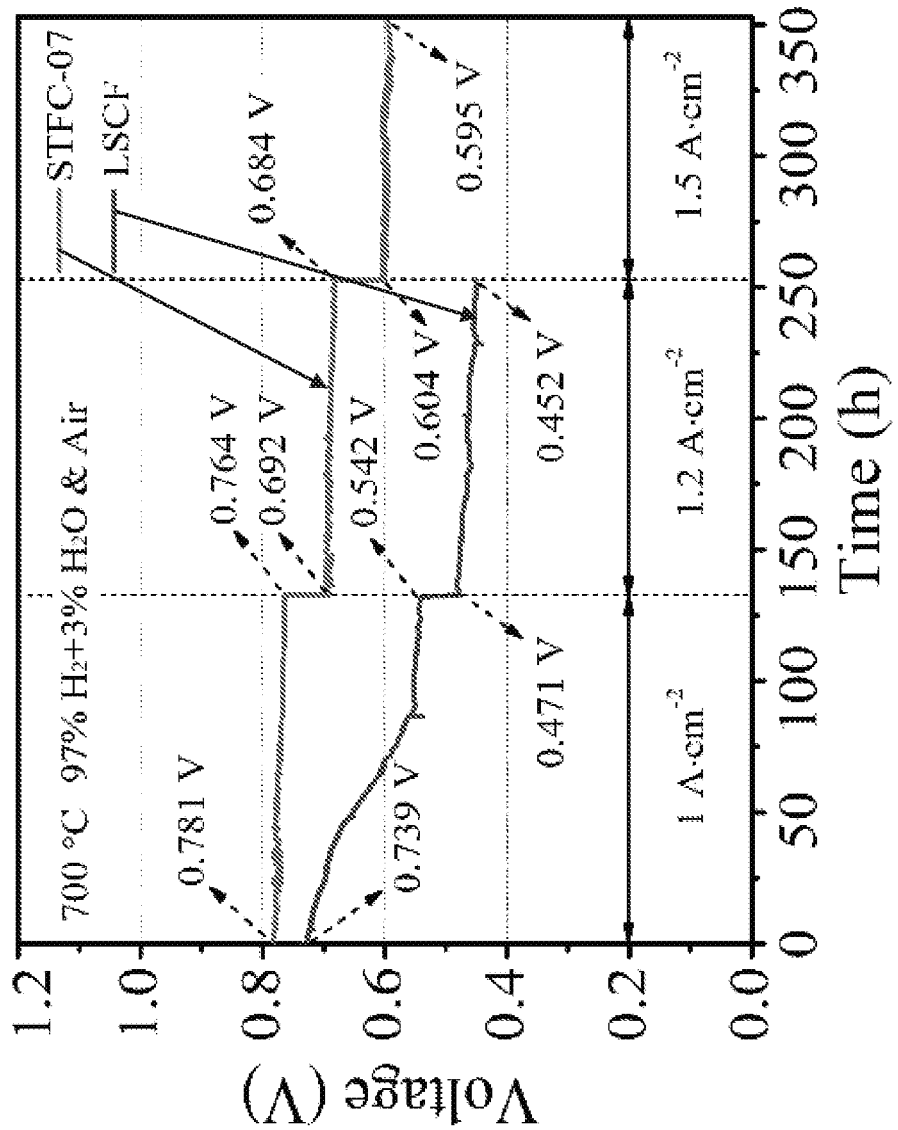
FIG. 8 shows a comparison of the SOC stability measurement of full fuel cells with either a STFC-07 or a LSCF electrode at a series of constant current load conditions at 700° C.

Initial results on full SOC stability are shown in FIG. 8. Cells with the STFC-07 and LSCF oxygen electrodes, but otherwise identical, were tested for 350 h at 700° C., with the cell current maintained first at 1.0, then 1.2, and finally 1.5 A cm$^{-2}$ (only for the STFC-07 cell). The initial voltage was higher for the STFC-07 electrode versus the LSCF electrode. During each constant current segment, the STFC-07 cell voltage decreased slightly, but the decrease was much less than that observed for the LSCF-electrode cell. EIS data from the STFC-07 cell before and after 250 h of testing showed that $R_P$ increased only slightly, with most of the cell resistance increase coming from an increase in ohmic resistance (data not shown). For comparison, the $R_P$ increase in the LSCF cells was substantial and appeared to be associated with the response at ~100 Hz, which could be associated with either the anode or the cathode. Comparison with the STFC-07 cell, where there was little degradation, and the above results for LSCF-electrode symmetric cells, suggests that the $R_P$ increase was associated with the LSCF. Fracture cross sectional SEM images showed no obvious changes in STFC-07 electrode microstructure after the life test (data not shown). For comparison, the microstructure of LSCF cathode had changed after 250 hours of testing (data not shown), with many nano-sized particles having formed on the LSCF surfaces. These may be segregated SrO particles.

Discussion

Electrode Polarization and Oxygen Transport Coefficients

In previous studies, it was shown that EIS data combined with 3D tomographic data can be used in the Adler-Lane-Steele (ALS) model to determine the oxygen solid state diffusion coefficient $D_{chem}$ and the oxygen surface exchange coefficient $k_{chem}$. (Y. Lu, et al., Journal of The Electrochemical Society, 2009, 156, B513; K. Yakal-Kremski, et al., Journal of The Electrochemical Society, 2014, 161, F1366-F1374; and J. Railsback, et al., Journal of The Electrochemical Society, 2016, 163, F1433-F1439.) This analysis is carried out here to obtain these fundamental transport parameters for the STFC electrodes. These values are useful for understanding the reasons for the good electrode performance and for making comparisons between STFC and other materials independent of electrode microstructure. The relevant expressions are given below.

The ALS model leads to a specific electrical equivalent circuit (Gerischer impedance element) with the form:

$$Z = R_G \sqrt{\frac{1}{1+(j\omega t_G)^\alpha}} \quad (1)$$

where Z is the complex impedance, $R_G$ is the Gerisher resistance and $t_G$ is the time constant. $R_G$ and $t_G$ are given by the ALS model as:

$$R_G = \frac{RT}{2F^2} \sqrt{\frac{\tau A_0^2}{\alpha(1-\varepsilon)D_{chem}k_{chem}\delta c_{mc}^2}} (pO_2)^{-0.25} \quad (2)$$

$$t_G = \frac{\delta(1-\varepsilon)}{4\alpha k_{chem}} (pO_2)^{-0.5} \quad (3)$$

where $\tau$ is the tortuosity, $\varepsilon$ is the porosity of solid phase, and $\alpha$ is the pore-electrode interfacial area per volume. These values are given in FIG. 2D. $c_{mc}$ is the oxygen concentration. $\delta$ is the oxygen vacancy fraction. $A_0$ is the thermodynamic factor, a function of oxygen chemical potential.

$$A_0 = \pm \frac{1}{2}\left(\frac{\partial \ln(PO_2)}{\partial \ln(\delta)}\right) \quad (4)$$

$R_G$ and $t_G$ are determined from the EIS fitting (data not shown), and the values are shown in Table 1. $A_0$ was calculated from FIG. 1C. $\delta$ and $A_0$ used are shown in Table 2. $D^*$ and $k_{chem}$ can be obtained:

$$D_{chem} = \left(\frac{RT}{4F^2 R_G}\right)^2 \frac{\tau A_0^2 t_G}{(1-\varepsilon)^2 c_{mc}^2 \delta^2} \quad (5)$$

$$k_{chem} = \frac{(1-\varepsilon)\delta}{4\alpha t_G} (pO_2)^{-0.5} \quad (6)$$

TABLE 1

Gerischer resistance $R_G$ ($\Omega$ cm$^2$) and time constant $t_G$ (s) values obtained from fitting the EIS data and used in the ALS model calculations.

| Temperature (° C.) | $R_G$ (STF) | $R_G$ (STFC-07) | $t_G$ (STF) | $t_G$ (STFC-07) |
|---|---|---|---|---|
| 600 | 0.282 | 0.113 | 0.0913 | 0.0422 |
| 650 | 0.131 | 0.045 | 0.0271 | 0.0091 |
| 700 | 0.054 | 0.021 | 0.0071 | 0.0028 |
| 750 | 0.026 | 0.0085 | 0.0022 | 0.0071 |
| 800 | 0.015 | 0.0045 | 0.0091 | 0.0029 |

TABLE 2

Oxygen nonstoichiometry ($\delta$) and thermodynamic factors ($A_0$) from TGA analysis used for ALS mode.

| Temperature (° C.) | $A_0$ (STF) | $A_0$ (STFC-07) | $\delta$ (STF) | $\delta$ (STFC-07) |
|---|---|---|---|---|
| 600 | 9.60 | 11.54 | 0.219 | 0.277 |
| 650 | 10.38 | 12.3 | 0.228 | 0.298 |
| 700 | 10.25 | 13.16 | 0.249 | 0.316 |
| 750 | 10.8 | 13.88 | 0.259 | 0.325 |
| 800 | 11.81 | 14.69 | 0.266 | 0.332 |

Figure 9B:
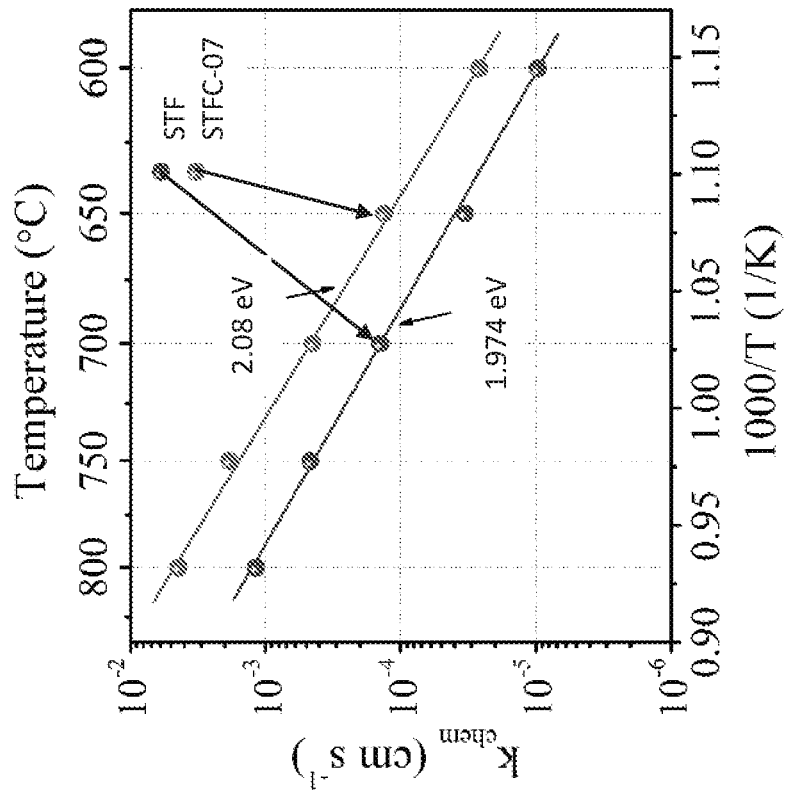
FIG. 9B shows $k_{chem}$ versus temperature for STF and STFC-07.
Figure 9A:
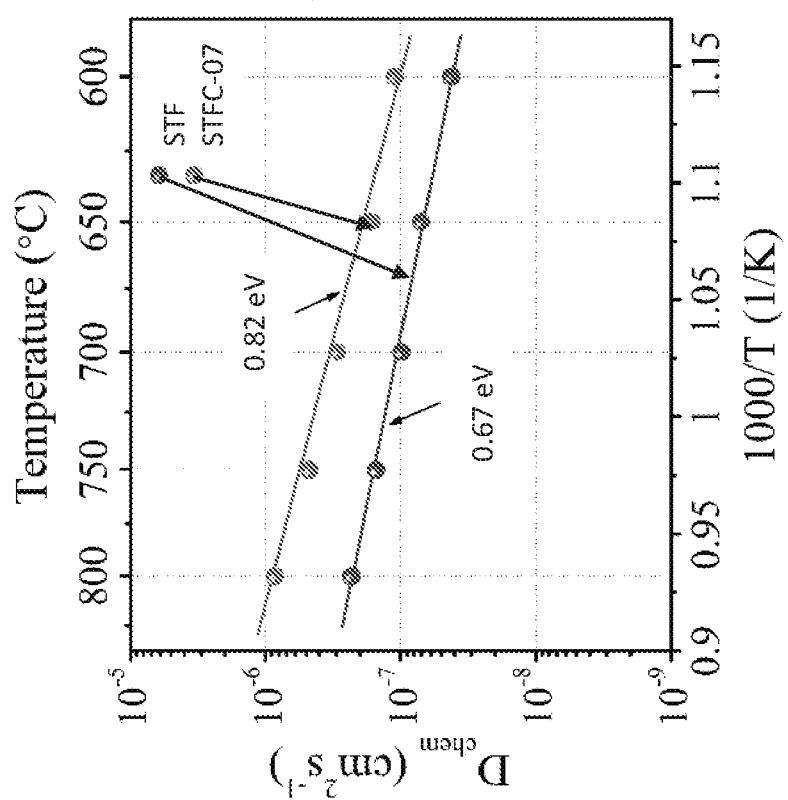
FIG. 9A shows $D_{chem}$ versus temperature for STF and STFC-07.

The Gerischer resistance $R_G$ and time constant $t_G$ values from the EIS fitted Gerischer response (Table 1) are used along with the electrode porosity, surface area, and solid-phase tortuosity (given in FIG. 2D). The other parameters needed include the oxygen vacancy concentration and thermodynamic factor, which were determined from the thermogravimetric data shown in FIG. 1C and are given in Table 2. The resulting $D_{chem}$ and $k_{chem}$ values are shown in FIG. 9A and FIG. 9B. Both $D_{chem}$ and $k_{chem}$ are ~3 times higher for STFC-07 compared to STF. These increases may arise from the decreased Sr surface segregation for STFC-07 compared to STF. Based on the ALS model expression for $R_P$, the reduction in $R_P$ caused by Co substitution can be explained by the increase in these oxygen transport coefficients, along with the small increase in oxygen vacancy concentration.

Table 3 gives a comparison of $\delta$, $D_{chem}$, and $k_{chem}$ of STF and STFC-07 at 700° C. with other MIEC oxygen electrode materials that are known to exhibit fast oxygen transport. The $D_{chem}$ value for STF in this Example was similar to the values reported for $SrTi_{0.5}Fe_{0.5}O_{3-\delta}$ (STF50) thin films under the same conditions. However, the $k_{chem}$ value for STF was ~10 times higher than that of STF50 thin film. The difference may be related to the different composition. Compared to LSCF, the $D_{chem}$ and $k_{chem}$ values for STFC-07 were ~1,000 and 100 times higher, respectively, while the $\delta$ value and hence the oxygen vacancy concentration was ~10 times higher. Since these increases reduced $R_P$, this confirms that the substantially lower $R_P$ reported here for STFC compared to LSCF was due to intrinsic materials property differences, not due to different electrode microstructure. Compared to BSCF and SSC, the $k_{chem}$ value for STFC-07 was lower, but within a factor of 5, $D_{chem}$ was lower by a factor of ~10-100, and the $\delta$ values were similar. That is, the transport properties of STFC-07 were clearly inferior to those of SSC and BSCF; as discussed further below, however, the stability of STFC-07 is significantly better.

Table 3 gives a comparison of oxygen nonstoichiometry ($\delta$), oxygen diffusion coefficient ($D_{chem}$ (cm$^{-2}$s$^{-1}$)), and oxygen surface exchange coefficient ($k_{chem}$ (cm s$^{-1}$)) of STF37 and STFC-07 at 700° C. in air with typical perovskite oxygen electrode materials reported in literature. STF50: $SrTi_{0.5}Fe_{0.5}O_{3-\delta}$, BSCF: $Ba_{0.5}Sr_{0.5}Co_{0.8}Fe_{0.2}O_{3-\delta}$, SSC: $Sm_{0.5}Sr_{0.5}CoO_{3-\delta}$, LSCF: $La_{0.6}Sr_{0.4}Co_{0.2}Fe_{0.8}O_{3-\delta}$.

| Material | $\delta$ | Ref. | $D_{chem}$ | Ref. | $k_{chem}$ | Ref. |
|---|---|---|---|---|---|---|
| STF50 | N/A | N/A | $1.1 \times 10^{-7}$ | a | $1.7 \times 10^{-5}$ | a |
| BSCF | 0.46 | b | $7.94 \times 10^{-6}$ | b | $1.26 \times 10^{-3}$ | b |
| SSC | 0.15 | c | $3.63 \times 10^{-5}$ | d | $2.51 \times 10^{-3}$ | e |
| LSCF | 0.023 | f | $2.5 \times 10^{-10}$ | f | $1.49 \times 10^{-6}$ | g |

-continued

| Material | δ | Ref. | $D_{chem}$ | Ref. | $k_{chem}$ | Ref. |
|---|---|---|---|---|---|---|
| STF | 0.249 | This Example | $9.84 \times 10^{-8}$ | This Example | $1.41 \times 10^{-4}$ | This Example |
| STFC-07 | 0.316 | This Example | $2.94 \times 10^{-7}$ | This Example | $4.48 \times 10^{-4}$ | This Example | a W. Jung, et al., 2008.
b E. Bucher, et al., Solid State Ionics, 2008, 179, 1032-1035.
c S. Yoo, et al., 2013.
d Y.-P. Fu, et al., Journal of Power Sources, 2013, 240, 168-177.
e T. C. Yeh, et al., Solid State Ionics, 2013, 232, 138-143.
f H. J. M. Bouwmeester, et al., 2004.
g B. C. H. Steele, et al., Solid State Ionics, 1998, 106, 255-261.

Regarding the full fuel cell test results, the relatively high current and power densities achieved are directly related to the relatively low polarization resistance of the STFC electrode. Cell performance may be improved further via various measures. At operating temperature ≥700° C. and low $H_2O$ partial pressure, for example, gas diffusion through the anode support appears to contribute a major portion of the cell ASR, such that cell performance could be improved by the use of a thinner or higher porosity support. At operating temperature <700° C., the oxygen electrode and YSZ electrolyte resistance are major contributors to the overall cell ASR. The results in FIGS. 3A-3B show that full fuel cells with STFC-15 electrodes would provide lower oxygen electrode polarization than the STFC-07 used in the present cells, allowing higher power density. Furthermore, given the excellent stability of the STFC electrodes, the electrodes can be microstructurally engineered to provide even better low-temperature performance while maintaining the requisite long-term stability. Finally, electrolyte resistance may be reduced, e.g. by utilizing an LSGM electrolyte instead of YSZ.

Electrode Stability

The symmetric cell life tests showed excellent stability of the STFC electrodes, much better than the widely-used LSCF electrodes. It appears that the good stability can be explained, at least in part, by the stable amount of surface segregated Sr observed in life tests. Also, note that in the symmetric cell tests with current, one electrode operated as an SOFC cathode while the other operated as an SOEC anode. Thus, the STFC electrodes appear to provide excellent stability in both modes of operation. Good stability at 1 A $cm^{-2}$ is especially notable given that most other oxygen electrodes degrade under electrolysis operation at this current density. A key reason for this is probably the low $R_P$ value, which leads to a relatively low electrode overpotential of <0.12 V during operation at 700° C. at 1 A $cm^{-2}$. This overpotential value, estimated using the measured electrode polarization resistance, was below the threshold value of ~0.2 V where degradation is normally observed, as expected based on an electrolyte fracture model. The full fuel cell life test, carried out in fuel cell mode, did show some degradation but was mostly due to an increase in ohmic resistance. Noting that this test was relatively short, and that STFC electrode was stable in the symmetric cell, it may be that this degradation was just an early-stage cell break-in effect. In summary, the STFC electrodes are promising for solid oxide electrolysis and reversing-current operation because of their stable performance at a relatively high current density.

Although some MIEC electrodes other than LSCF may provide better initial performance than the present STFC electrodes, degradation is often a serious problem. For example, BSCF and SSC electrodes provide excellent initial performance but degrade during the life tests due to surface segregation and absorption of $CO_2$ and $SO_2$. For example, Giuliano et al. (2017) reported an initial $R_p$ for BSCF at 700° C. of ~0.035 Ω $cm^2$, lower than that of STFC-15 (0.043 Ω $cm^2$). However, after ageing at 700° C. for 200 h at a current density of 0.2 A $cm^{-2}$, $R_p$ increased to 0.055 Ω $cm^2$ because of the Sr and Ba segregation. In contrast, the good stability presented in this Example indicates that Sr surface segregation, while present, did not increase under cell operating conditions. Another means for reducing oxygen electrode polarization resistance is via MIEC materials with a nanoscale structure that provides high surface area, typically produced via impregnation. While very good initial performance can be achieved, degradation via nanoparticle coarsening has been observed. Recent results suggest that $R_p$ values of ~0.2 Ω $cm^2$ can be achieved at 600° C., similar to the present STFC-15 electrodes, for infiltrated LSCF or SSC electrodes. However, the present particle-based process is much easier to implement than the multiple impregnation steps required to make good nano-scale electrodes.

Summary and Conclusions

A comprehensive study of a new oxygen electrode composition, $Sr(Ti_{0.3}Fe_{0.7-x}Co_x)O_{3-\delta}$ (x=0–0.15), is presented. Increasing substitution of Co into the oxide substantially increased electronic conductivity, reduced Sr surface segregation, reduced electrode polarization resistance, increased oxygen vacancy concentration, and increased both oxygen surface exchange rate and oxygen diffusion coefficient. A Co concentration x=0.07 was suitable for cell operation≥700° C., but the lower polarization resistance achieved at x=0.15 was desirable for cells operating as low as 600° C. The electrodes were demonstrated to provide excellent performance in anode-supported cells operating in either fuel cell or electrolysis modes.

The STFC electrodes compare very favorably with the LSCF electrodes widely used in state-of-the-art solid oxide fuel cells and electrolysis cells. Key advantages include the following: polarization resistance values ~3× lower for electrodes with similar microstructure, with values low enough for operation down to ~600° C. for x=0.15; improved oxygen transport kinetics, including >100× higher oxygen surface exchange and oxygen diffusion coefficients, along with ~10× higher oxygen vacancy concentration; superior performance stability, e.g. no measurable degradation observed during 1000 h life tests, compared to >30% resistance degradation for LSCF electrodes under the same conditions; the electrode is composed of inexpensive earth-abundant materials, with no rare-earth elements and only a small amount of Co.

Data or information referenced as not shown may be found in U.S. Provisional Patent Application No. 62/637,630 filed Mar. 2, 2018, which is hereby incorporated by reference.

Example 2

Introduction

Recent developments in solid oxide fuel cells (SOFCs) have focused on dropping the operating temperature below 650° C. for improved costs and viability for commercialization. $La_{0.6}Sr_{0.4}Co_{0.2}Fe_{0.8}O_{3-\delta}$ (LSCF) is a commonly used oxygen electrode in solid oxide cells but has poor electrochemical performance below 650° C. and is known to degrade under a variety of operating conditions. In this Example, we improve on the performance and stability of LSCF and $SrTi_{0.3}Fe_{0.55}Co_{0.15}O_{3-\delta}$ (STFC) (see Example 1) is improved upon with the addition of $PrO_x$ nanoparticles on the surface using only a single-step infiltration. The PrOx infiltration has a beneficial effect on electrode performance at all temperatures. The most significant improvement is observed at low temperature. Impedance spectroscopy measurements show that the total polarization resistance in LSCF drops from 2.05 to 0.58 $\Omega \cdot cm^2$ with the addition of $PrO_x$ at 550° C. and in STFC from 0.57 further down to 0.22 $\Omega \cdot cm^2$. Life test results are also presented for LSCF and STFC, with the STFC and $PrO_x$ system displaying the best stability, degrading from 0.22 to only 0.28 $\Omega \cdot cm^2$ after 998 hours at 550° C. and from 0.07 to only 0.10 $\Omega \cdot cm^2$ after 1003 hours at 650° C. The maximum power densities with STFC and $PrO_x$ are 0.27, 0.56, and 0.98 $Wcm^{-2}$ at 550° C., 600° C., and 650° C.

Methods

Symmetric cells were prepared on $Ce_{0.9}Gd_{0.1}O_{2-\delta}$ (GDC) electrolyte supports fabricated by pellet pressing 0.5 g of powder at 2 metric tons and sintering at 1450° C. for 6 hours. 2 layers of LSCF (Praxair) were screen printed on either side of the GDC support and sintered at 1100° C. for 2 hours. STFC was fabricated as described in Example 1, above. Two layers of STFC were screen printed and sintered at 1050° C. for 3 hours. A $Pr(NO)*H_2O$ solution was prepared by dissolving in deionized $H_2O$ with Triton X-100 has a surfactant. Electrodes were infiltrated with 1 μL of solution, placed under vacuum, and fired at 450° C. for 30 minutes. Ni-YSZ full cells with GDC barrier layers were fabricated using a tape casting process as described in Example 1, above. Silver grids (Heraeus) were screen printed as current collectors, and attached using silver wires in a 4-point probe setup for electrical measurements.

Electrochemical impedance spectra were taken using an IM6 Electrochemical Workstation (ZAHNER, Germany) and a SquidStat Plus (Admiral Instruments) with a 20 mV perturbation from 1 MHz to 0.1 Hz. All oxygen electrodes were tested in ambient air and full cell fuel electrodes were tested in 3% $H_2O$ humidified hydrogen with a flow rate of 100 sccm. LSCF cells were fit using an inductor, resistor, RQ (low frequency), and Gerischer (high frequency) in series. STFC cells were fit using an inductor, resistor, RQ (low frequency), Gerischer (mid frequency), and RQ (high frequency) in series. Cells were imaged using a Hitachi SU8030 scanning electron microscope. Sr segregation measurements utilized inductively coupled plasma-optical emission spectroscopy using a Thermo iCAP 7600.

Results

Figure 12:
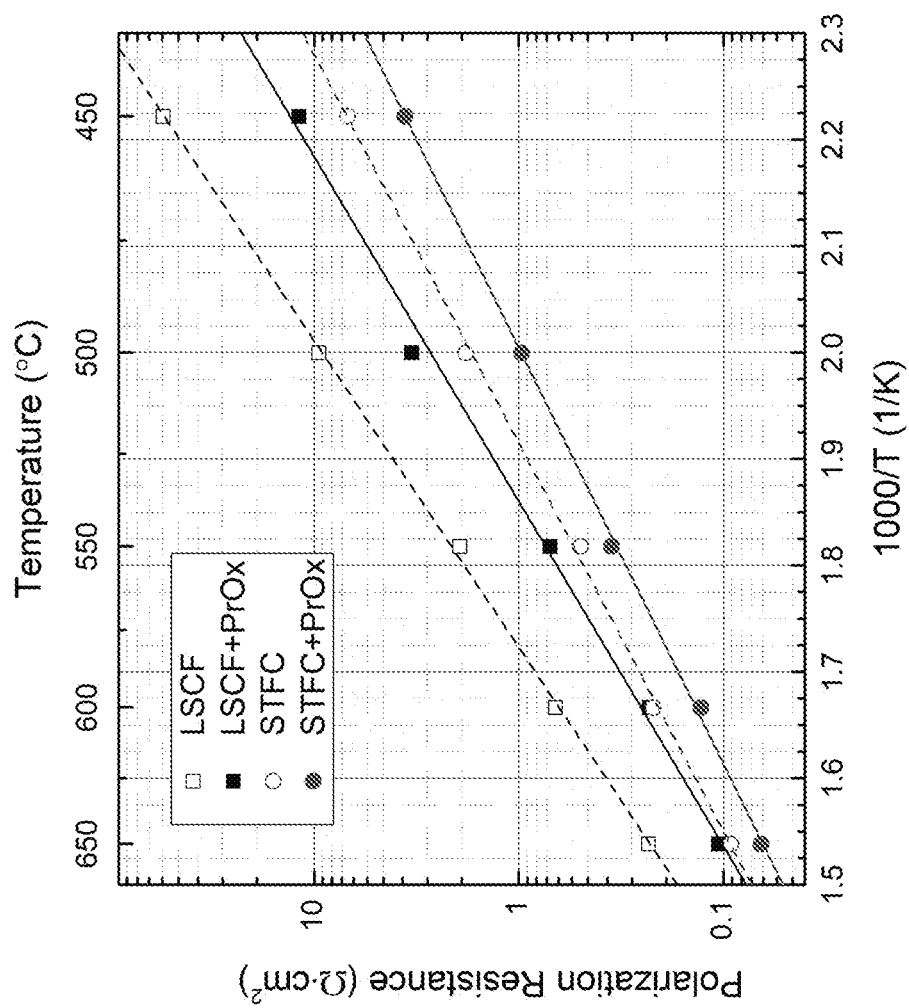
FIG. 12 shows polarization resistance as a function of temperature for $La_{0.6}Sr_{0.4}Co_{0.2}Fe_{0.8}O_{3-\delta}$ and $SrTi_{0.3}Fe_{0.55}Co_{0.15}O_{3-\delta}$ both with and without the nanoinfiltrated $PrO_x$ catalyst.

FIG. 12 compares the polarization resistances between the oxygen electrode materials LSCF and STFC. For both MIEC electrodes, the polarization resistances of a pristine cell and a single-step $PrO_x$-infiltrated cell are presented across the temperature range of interest for solid oxide cells (SOCs) from 450 to 650° C. At all temperatures, the addition of a $PrO_x$ nanocatalyst improves the polarization resistance. The low temperature performance of STFC is superior to that of LSCF and LSCF infiltrated with $PrO_x$.

The cells were life tested by thermally annealing at 650° C. for ~1000 hours while the electrochemical performance was monitored using operando electrochemical impedance spectroscopy. Nyquist and Bode plots (data not shown) of pristine LSCF thermally annealed at 650° C. for ~1000 hours showed the impact of the nanoinfiltrated $PrO_x$ surface catalyst. Pristine LSCF had an initial polarization resistance of 0.18 $\Omega \cdot cm^2$ which degrades to 0.25 $\Omega \cdot cm^2$ after 1013 hours due to an increase in the low frequency response around 10 Hz, likely correlated to a surface process. The addition of $PrO_x$ greatly improves the polarization resistance, dropping the initial resistance from 0.18 $\Omega \cdot cm^2$ to 0.09 $\Omega \cdot cm^2$. However, the addition of the $PrO_x$ catalyst does not prevent degradation, and the LSCF+$PrO_x$ cell polarization resistance continues to increase to 0.21 $\Omega \cdot cm^2$. Similar plots were obtained for cells in which STFC replaced LSCF (data not shown). STFC demonstrates superior stability compared to that of LSCF, in agreement with the findings of Example 1, above, polarization resistance values of between 0.21 and 0.23 $\Omega \cdot cm^2$ during the course of the life test. The addition of $PrO_x$ improves the polarization resistance to 0.07 $\Omega \cdot cm^2$, which slowly degrades to 0.10 $\Omega \cdot cm^2$ after 1003 hours.

Figure 13:
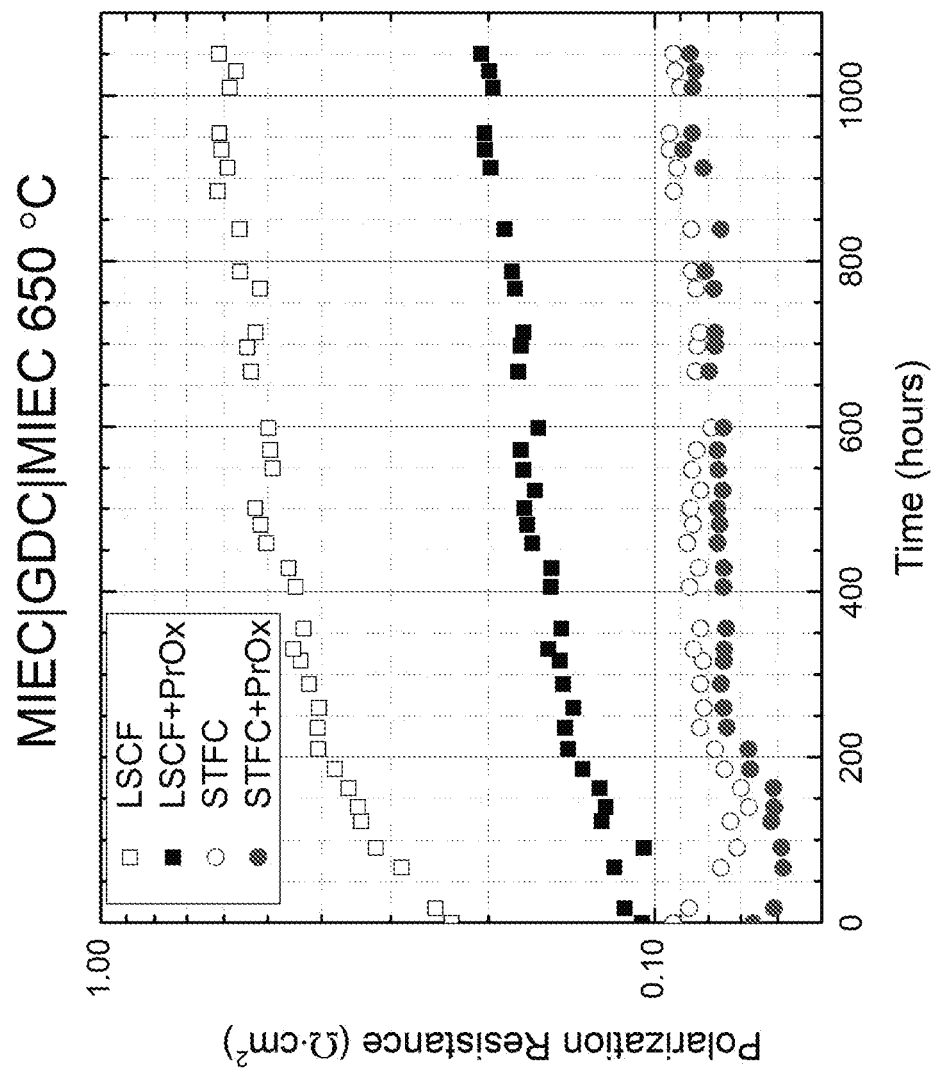
FIG. 13 shows polarization resistance values of $La_{0.6}Sr_{0.4}Co_{0.2}Fe_{0.8}O_{3-\delta}$, $La_{0.6}Sr_{0.4}Co_{0.2}Fe_{0.8}O_{3-\delta}$+$PrO_x$, $SrTi_{0.3}Fe_{0.55}Co_{0.15}O_{3-\delta}$, and $SrTi_{0.3}Fe_{0.55}Co_{0.15}O_{3-\delta}$+$PrO_x$ electrodes on $Ce_{0.9}Gd_{0.1}O_{2-\delta}$ electrolyte supports life tested at 650° C. for ~1000 hours.

The polarization resistance values for these cells at 650° C. over ~1000 hours are plotted in FIG. 13. LSCF and LSCF+$PrO_x$ degrade at a similar but offset rate, indicating that the LSCF scaffold is likely the source of degradation. At 650° C., LSCF and LSCF+$PrO_x$ initially have polarization resistances lower than pristine STFC, but rapidly degrade to the point where the resistances are similar after 1000 hours. Continual degradation beyond 1000 hours is likely. Pristine STFC, on the other hand, is stable. Nanoinfiltrated STFC degrades slowly, likely due to the addition of $PrO_x$. Degradation of the $PrO_x$ is likely present in the LSCF+$PrO_x$ case, but its contribution is small when compared to the overall degradation from LSCF.

With the good performance and stability achieved with STFC+$PrO_x$ at 650° C., additional experiments were performed at the lower temperature of 550° C. From the Nyquist and Bode plots (not shown), LSCF performs poorly at this temperature with an initial polarization of 2.05 $\Omega \cdot cm^2$ that degrades to 2.97 $\Omega \cdot cm^2$ after 998 hours. The addition of $PrO_x$ significantly improves the performance at this temperature. The polarization resistance improves to 0.58 $\Omega \cdot cm^2$ at the start of the test and degrades to 0.70 $\Omega \cdot cm^2$ after 998 hours. Similar to the performance at 650° C., LSCF degrades rapidly during the 1000 hour thermal anneal. By contrast, pristine STFC demonstrates reasonable performance and excellent stability at 550° C. with an initial and 998 hour polarization resistance of 0.57 $\Omega \cdot cm^2$. The addition of $PrO_x$ further improves the initial performance to 0.22 $\Omega \cdot cm^2$, approximately an order of magnitude improvement over the state-of-the-art LSCF electrode. The STFC+$PrO_x$ sample degrades to 0.28 Ω·cm² after 998 hours, but easily outperforms all other samples. For both LSCF and STFC, the $PrO_x$ surface catalyst greatly reduces the low frequency response, which is attributed to a surface exchange process.

Figure 14:
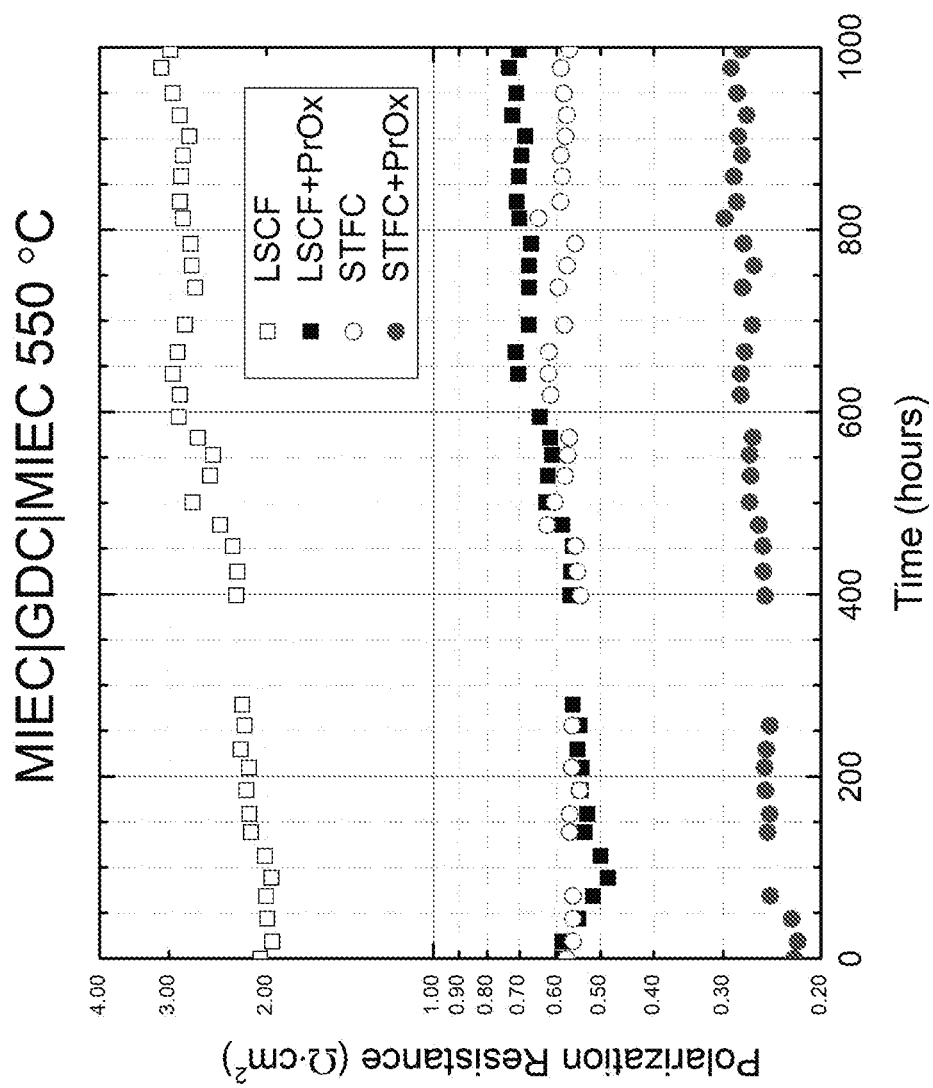
FIG. 14 shows polarization resistance values of $La_{0.6}Sr_{0.4}Co_{0.2}Fe_{0.8}O_{3-\delta}$, $La_{0.6}Sr_{0.4}Co_{0.2}Fe_{0.8}O_{3-\delta}$+$PrO_x$, $SrTi_{0.3}Fe_{0.55}Co_{0.15}O_{3-\delta}$, and $SrTi_{0.3}Fe_{0.55}Co_{0.15}O_{3-\delta}$+$PrO_x$ electrodes on $Ce_{0.9}Gd_{0.1}O_{2-\delta}$ electrolyte supports life tested at 550° C. for ~1000 hours. The results are plotted on a log scale to emphasize detail at lower resistance values.

In FIG. 14, the polarization resistances of the cells are compared over the 1000 hours of testing. LSCF shows the highest polarization resistance values, and also the highest degradation rate, proving LSCF is not a good candidate for operation at this lower temperature. However, surface modification improves the performance significantly, perhaps benefiting the rate limiting surface step. The LSCF+$PrO_x$ and STFC+$PrO_x$ cells both show a gradual onset of degradation, different in character from their pristine counterparts, indicating that some degradation is associated with the $PrO_x$ catalyst.

The STFC+$PrO_x$ electrode was tested on a typical full cell in air with a YSZ electrolyte and Ni-YSZ fuel electrode in 97% $H_2$ and 3% $H_2O$ (data not shown). The cell achieves reasonably good low temperature performance with peak power densities of 0.98 W·cm⁻² at 650° C., 0.56 W·cm⁻² at 600° C., and 0.27 W·cm⁻² at 550° C. Because of the low temperatures, the resistance contribution of the YSZ electrolyte and Ni-YSZ fuel electrode become significant due to the low conductivities at these temperatures.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. An oxygen electrode comprising a perovskite compound having Formula IA, $Sr(Ti_{0.3}Fe_{0.7-x}Co_x)O_{3-\delta}$ wherein $0.04 \geq x \geq 0.15$.

2. The electrode of claim 1, wherein $0.07 \geq x \geq 0.15$.

3. The electrode of claim 1, wherein x=0.07.

4. The electrode of claim 1, wherein x=0.15.

5. The electrode of claim 1, further comprising a plurality of praseodymium oxide nanoparticles distributed on a surface of the perovskite compound.

6. An electrochemical device comprising the oxygen electrode of claim 1, a counter electrode in electrical communication with the oxygen electrode, and a solid oxide electrolyte between the oxygen electrode and the counter electrode.

7. The electrochemical device of claim 6, wherein $0.07 \geq x \geq 0.15$.

8. The electrochemical device of claim 6, wherein x=0.07.

9. The electrochemical device of claim 6, wherein x=0.15.

10. A method comprising exposing the oxygen electrode of the electrochemical device of claim 6 to a fluid comprising $O_2$ under conditions to induce the reaction $O_2 + 4e^- \rightarrow 2O^{2-}$, or to a fluid comprising $O_{2-}$ under conditions to induce the reaction $2O^{2-} \rightarrow O_2 + 4e^-$.

11. The method of claim 10, wherein the conditions include an operating temperature of no more than 700° C.

12. The method of claim 10, wherein the conditions include an operating temperature of no more than 600° C.

13. The method of claim 12, wherein the oxygen electrode exhibits a constant polarization resistance value ($R_p$) while carrying out the method over a time period of at least 1000 hours.

* * * * *